United States Patent
Matsui et al.

(10) Patent No.: US 10,033,049 B2
(45) Date of Patent: Jul. 24, 2018

(54) NON-AQUEOUS ELECTROLYTE FOR ELECTROCHEMICAL DEVICES, METHOD FOR PRODUCING THE SAME, AND ELECTROCHEMICAL DEVICE USING THE SAME

(71) Applicant: PANASONIC CORPORATION, Osaka (JP)

(72) Inventors: Tooru Matsui, Osaka (JP); Zempachi Ogumi, Kyoto (JP); Toshiro Hirai, Kyoto (JP); Akiyoshi Nakata, Kyoto (JP)

(73) Assignee: Panasonic Corporation, Osaka (JP)

( * ) Notice: Subject to any disclaimer, the term of this patent is extended or adjusted under 35 U.S.C. 154(b) by 473 days.

(21) Appl. No.: 14/235,023

(22) PCT Filed: Mar. 11, 2013

(86) PCT No.: PCT/JP2013/001561
§ 371 (c)(1),
(2) Date: Jan. 24, 2014

(87) PCT Pub. No.: WO2013/157187
PCT Pub. Date: Oct. 24, 2013

(65) Prior Publication Data
US 2014/0170507 A1    Jun. 19, 2014

(30) Foreign Application Priority Data

Apr. 16, 2012  (JP) .................. 2012-092731
Apr. 16, 2012  (JP) .................. 2012-092732
Apr. 16, 2012  (JP) .................. 2012-092734

(51) Int. Cl.
*H01M 6/16*      (2006.01)
*H01M 10/052*    (2010.01)
(Continued)

(52) U.S. Cl.
CPC ............ *H01M 6/166* (2013.01); *H01G 11/60* (2013.01); *H01G 11/62* (2013.01);
(Continued)

(58) Field of Classification Search
CPC ........... H01M 10/054; H01M 10/0568; H01M 10/0569; H01G 11/60; H01G 11/62
See application file for complete search history.

(56) References Cited

U.S. PATENT DOCUMENTS 5,552,244 A * 9/1996 Griffin .............. H01M 10/0563
                                                29/623.1
6,265,109 B1 7/2001 Yamamoto et al.
(Continued)

FOREIGN PATENT DOCUMENTS

EP    2 169 755 A1   3/2010
JP    62-002469 A    1/1987
(Continued)

OTHER PUBLICATIONS

Masahiro Shiraga, "Electrochemical Properties of Negative Electrode for Metallic Magnesium Secondary Battery in Ether-based Electrolyte," p. 1-5 with partial English Translation, Mar. 11, 2011.
(Continued)

*Primary Examiner* — Jimmy Vo
(74) *Attorney, Agent, or Firm* — McDermott Will & Emery LLP

(57) ABSTRACT

The present invention provides: a non-aqueous electrolyte for an electrochemical device, having ion conductivity sufficient for practical use and capable of improving energy density; a method for producing the same; and an electrochemical device using the same. The non-aqueous electrolyte for an electrochemical device includes a non-aqueous solvent and an alkaline earth metal chloride. The alkaline earth metal chloride is dissolved in an amount of 0.015 mol
(Continued)

or more relative to 1 mol of the non-aqueous solvent. The total content of the non-aqueous solvent and the alkaline earth metal chloride is 70 mass % or more in the non-aqueous electrolyte.

10 Claims, 7 Drawing Sheets

(51) Int. Cl.
*H01M 10/054* (2010.01)
*H01M 10/0568* (2010.01)
*H01M 10/0569* (2010.01)
*H01G 11/60* (2013.01)
*H01G 11/62* (2013.01)

(52) U.S. Cl.
CPC ....... *H01M 10/052* (2013.01); *H01M 10/054* (2013.01); *H01M 10/0568* (2013.01); *H01M 10/0569* (2013.01); H01M 2300/0034 (2013.01); *Y02E 60/13* (2013.01)

(56) References Cited

U.S. PATENT DOCUMENTS

| 7,026,075 | B2 | 4/2006 | Takami et al. |
| 2004/0010101 | A1* | 1/2004 | Wagner ................. C08F 10/00 526/124.3 |
| 2009/0068568 | A1* | 3/2009 | Yamamoto ........ H01M 10/0568 429/340 |
| 2010/0136438 | A1 | 6/2010 | Nakayama et al. |
| 2012/0107698 | A1* | 5/2012 | Muldoon ............. H01M 10/054 429/337 |
| 2014/0162143 | A1 | 6/2014 | Watahiki et al. |

FOREIGN PATENT DOCUMENTS

| JP | 2000-133307 A | 5/2000 |
| JP | 2001-023685 A | 1/2001 |
| JP | 2003-506832 A | 2/2003 |
| JP | 2004-327326 A | 11/2004 |
| JP | 2007-188694 A | 7/2007 |
| JP | 2009-021085 A | 1/2009 |
| WO | 01/09972 A1 | 2/2001 |
| WO | 2009/008232 A1 | 1/2009 |
| WO | 2013/015369 A1 | 1/2013 |

OTHER PUBLICATIONS

International Search Report issued in International Application No. PCT/JP2013/001561 dated Apr. 23, 2013, with English Translation.
Search Report issued in corresponding Chinese Patent Application No. 2013800022841, dated Jan. 21, 2016; with partial English translation.
Japanese Office Action issued in corresponding Japanese Patent Application No. 2013-551816, dated Sep. 20, 2016.

\* cited by examiner

[Fig. 3]
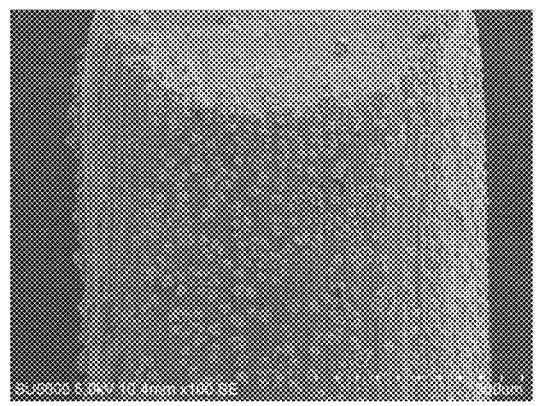
FIG. 4
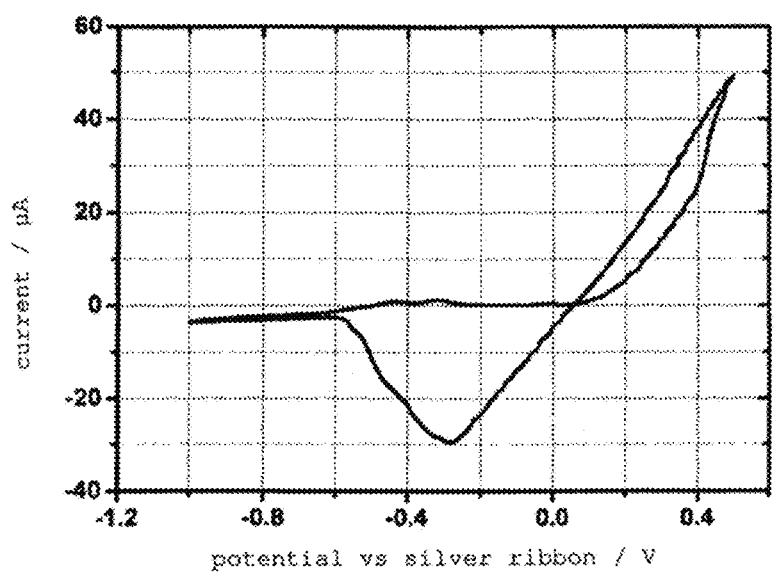

[Fig. 9]
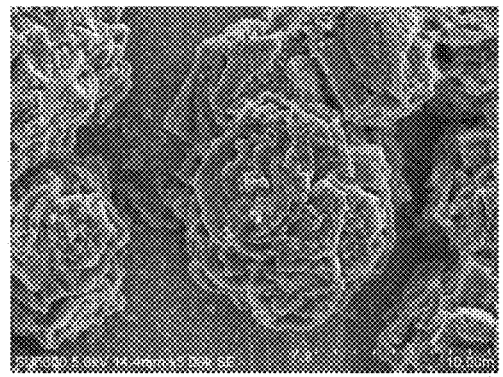
FIG. 10
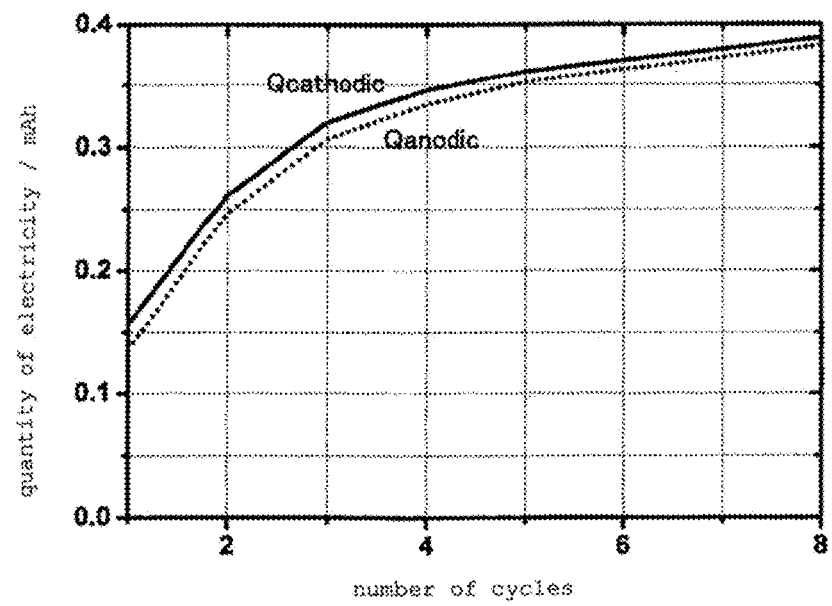

NON-AQUEOUS ELECTROLYTE FOR ELECTROCHEMICAL DEVICES, METHOD FOR PRODUCING THE SAME, AND ELECTROCHEMICAL DEVICE USING THE SAME

RELATED APPLICATIONS

This application is the U.S. National Phase under 35 U.S.C. § 371 of International Application No. PCT/JP2013/001561, filed on Mar. 11, 2013, which in turn claims the benefit of Japanese Application No. 2012-092731, filed on Apr. 16, 2012, Japanese Application No. 2012-092732, filed on Apr. 16, 2012, and Japanese Application No. 2012-092734, filed on Apr. 16, 2012, the disclosures of which Applications are incorporated by reference herein.

TECHNICAL FIELD

The present invention relates to a non-aqueous electrolyte used in an electrochemical device, a method for producing the same, and an electrochemical device using the same. The present invention particularly relates to an improvement of a non-aqueous electrolyte including an alkaline earth metal chloride as a supporting salt.

BACKGROUND ART

In batteries such as lithium primary batteries and lithium secondary batteries, lithium metal or a graphite intercalation compound in which lithium is intercalated, is used as a negative electrode active material, due to its low potential and high capacity. Lithium metal has an electric capacity of 2060 mAh/cm$^3$; and the above graphite intercalation compound, with a composition of $C_6Li$, has an electric capacity of 850 mAh/cm$^3$. However, in recent years, devices with built-in batteries (e.g., cellular phones, personal digital assistants, laptop computers, video cameras, portable game consoles) are required to give higher performance and have longer battery runtime. Demands are also increasing for higher energy density in batteries.

In view of the foregoing, being considered are non-aqueous electrolyte batteries, etc. which use a negative electrode active material higher in capacity than lithium metal and the above graphite intercalation compound, examples of such an active material including magnesium metal (electric capacity: 3830 mAh/cm$^3$) and calcium metal (electric capacity: 2070 mAh/cm$^3$). If such batteries are realized, one can expect a higher energy density compared to batteries which use lithium metal as a negative electrode active material. To use magnesium metal as a negative electrode active material, it would be necessary to use a non-aqueous electrolyte including magnesium ions at high concentrations and thus having high ion conductivity.

On the other hand, electrochemical devices such as batteries and capacitors use, as an electrolyte, a non-aqueous electrolyte comprising a non-aqueous solvent and a supporting salt dissolved in the non-aqueous solvent. In the non-aqueous electrolyte, the supporting salt dissociates into cations and anions, and these ions (cations, in particular) become charge carriers in a battery reaction. Exemplary electrochemical devices include lithium primary batteries (e.g., lithium manganese dioxide batteries, lithium carbon fluoride batteries), lithium secondary batteries, and lithium ion capacitors. In these electrochemical devices, ions which act as charge carriers (hereafter, also simply referred to as carrier ions) are mainly lithium ions.

In electrochemical devices which use lithium ions as carrier ions, a lithium salt is used as the supporting salt. Widely used in particular, are lithium hexafluorophosphate (LiPF$_6$), lithium tetrafluoroborate (LiBF$_4$), lithium perchlorate (LiClO$_4$), lithium trifluoromethylsulfonate (LiCF$_3$SO$_3$), and lithium bis(trifluoromethanesulfonyl)imide (LiN(SO$_2$CF$_3$)$_2$).

Although lithium ions are monovalent cations, if polyvalent cations such as magnesium ions are used as carrier ions, the amount of charge carried would be twice as much, or more, even when the concentration of the carrier ions remain the same in the non-aqueous electrolyte. Alkaline earth metal ions such as magnesium ions are divalent cations, and their use as carrier ions are expected due to their comparatively small formula weight. If the supporting salt has a small formula weight, the amount of the non-aqueous electrolyte used could be made smaller, and thus, the volume occupied by the electrodes could be made larger, thereby facilitating increase in energy density.

Anions of the supporting salt comprise non-metal elements, examples of such anions including hexafluorophosphate ion (PF$_6^-$), tetrafluoroborate ion (BF$_4^-$), perchlorate ion (ClO$_4^-$), and trifluoromethanesulfonylimide ion (N(SO$_2$CF$_3$)$_2^-$); and such anions facilitate making the formula weight comparatively smaller and serve to increase energy density in electrochemical devices. For example, Mg(ClO$_4$)$_2$, Mg(N(SO$_2$CF$_3$)$_2$)$_2$, and the like dissolve comparatively easily in a non-aqueous solvent. However, combining these with polyvalent cations would cause the supporting salt to include anions in an amount twice as much, or more, compared to when a lithium salt is used; and as a result, the formula weight of the supporting salt would increase. As such, for reducing the formula weight of the supporting salt, selecting what kind of anion to use is also important.

If anions can comprise one non-metal element, and not two or more non-metal elements as with hexafluorophosphate ions, perchlorate ions, and the like, the formula weight could be made smaller. Examples of such non-metal anions include halogen ions such as chloride ion and bromide ion.

In Patent Literature 1, it is reported that when a liquid electrolyte comprising 2-methyltetrahydrofuran and magnesium bromide (MgBr$_2$) dissolved in the 2-methyltetrahydrofuran is used, magnesium metal in the negative electrode is dissolvable and depositable.

Chloride ions have a smaller formula weight compared to bromide ions, and are therefore presumed to easily reduce the amount of the non-aqueous electrolyte. Magnesium chloride (MgCl$_2$) has a formula weight of 95.2, being about the same as the LiBF$_4$ formula weight of 93.7 and smaller than the LiPF$_6$ formula weight of 151.9. However, an alkaline earth metal chloride such as magnesium chloride has low solubility in an organic solvent, and almost does not dissolve at all in a carbonate or the like typically used as a non-aqueous solvent.

Patent Literature 1 proposes a polymer electrolyte comprising polyethylene glycol and δ-type magnesium chloride uniformly dissolved in the polyethylene glycol.

Patent Literature 2 proposes a magnesium-ion-containing liquid electrolyte comprising magnesium chloride and an aluminum complex; and suggests that the aluminum complex acts to turn the magnesium chloride into binuclear complex ions for dissolution.

CITATION LIST

Patent Literatures

[Patent Literature 1] Japanese Laid-Open Publication No. 2003-506832
[Patent Literature 2] Japanese Laid-Open Publication No. 2009-21085

Non-Patent Literature

[Non-Patent Literature 1] "Electrochemical Properties of Negative Electrode for Metallic Magnesium Secondary Battery in Ether-based Electrolyte" (seminar handout provided in the 76$^{th}$ Seminar held by The New Battery Concept Section); published by The New Battery Concept Section of The Committee of Battery Technology, The Electrochemical Society of Japan; Mar. 11, 2011; p. 1-5.

SUMMARY OF INVENTION

Technical Problem

Non-Patent Literature 1 teaches using magnesium bromide as a supporting salt for an electrolyte. However, the formula weight of magnesium bromide is 184.1, which is considerably larger than that of magnesium chloride, and much larger than that of LiPF$_6$ being 151.9. Therefore, in terms of increasing energy density, advantage in using magnesium bromide is small.

If magnesium bromide, or a solution including Mg(ClO$_4$)$_2$ or Mg(N(SO$_2$CF$_2$)$_2$)$_2$ with comparatively high solubility in a non-aqueous solvent, is used as a non-aqueous electrolyte, magnesium metal would tend to be easily deposited in the shape of needles during charge. Since magnesium metal is harder than lithium metal, if it is deposited as crystals in the shape of needles, internal short circuits would very likely occur.

Patent Literature 1 discloses a polymer electrolyte comprising polyethylene glycol and 5-type magnesium chloride uniformly dissolved in the polyethylene glycol. Compared to a liquid electrolyte, a polymer electrolyte is presumably more unlikely to cause short circuits that are due to needle-shaped crystals. However, Patent Literature 1 does not disclose the specific level of concentration at which the magnesium chloride dissolves. Typically, it is presumed difficult to dissolve magnesium chloride, which has low solubility in an organic solvent, at high concentrations in a polymer. Moreover, the electrolyte in Patent Literature 1 is a polymer electrolyte, and therefore has lower ion conductivity compared to a liquid electrolyte. Therefore, in Patent Literature 1, it is not possible to obtain ion conductivity sufficient for a battery to extract sufficient current.

According to Patent Literature 2, 1 mol of an aluminum complex acts on 1 mol of magnesium chloride, thereby producing binuclear complex ions of magnesium; and these ions dissolve in an electrolyte. Each of the binuclear complex ions produced includes 2 atoms of magnesium, but in overall, has a valence of 2; and therefore, the amount of charge that can be carried does not differ from when lithium ions are used. Moreover, in Patent Literature 2, to dissolve the magnesium chloride, the number of moles of the aluminum complex is required to be the same as that of the magnesium chloride. The aluminum complex has a large formula weight, and may become the cause of unnecessary increase in the amount of the electrolyte used. Moreover, the aluminum complex needs to be handled with caution, since it is highly combustible and corrosive as well.

Theoretically, by using a non-aqueous electrolyte including a high concentration of alkaline earth metal ions, an electrochemical device with a high energy density can presumably be obtained. Moreover, an alkaline earth metal chloride such as magnesium chloride costs less than a lithium salt, and is therefore expected to be able to reduce the cost of an electrochemical device.

However, since an alkaline earth metal chloride such as magnesium chloride has low solubility in a non-aqueous solvent, it is difficult to obtain a non-aqueous electrolyte which includes an alkaline earth metal chloride as a supporting salt. Moreover, even if a non-aqueous solution including magnesium ions can be prepared as described above, it would be difficult to sufficiently trigger an electrochemical reaction capable of causing dissolution and deposition of magnesium metal used as a negative electrode active material. That is, in reality, yet to be obtained is a non-aqueous electrolyte which includes alkaline earth metal ions at high concentrations, exhibits electrochemical properties sufficient for the electrolyte to withstand practical use, and has high ion conductivity.

One aspect of the present invention is to aim to provide the following: a non-aqueous electrolyte for an electrochemical device, the non-aqueous electrolyte having ion conductivity sufficient for practical application and being capable of improving energy density; a method for producing the same; and an electrochemical device using the same.

Solution to Problem

One aspect of the present invention relates to a non-aqueous electrolyte for an electrochemical device comprising a non-aqueous solvent and an alkaline earth metal chloride,
the alkaline earth metal chloride being dissolved in an amount of 0.015 mol or more relative to 1 mol of the non-aqueous solvent, and
a total content of the non-aqueous solvent and the alkaline earth metal chloride being 70 mass % or more in the non-aqueous electrolyte.

Another aspect of the present invention relates to a method for producing a non-aqueous electrolyte for an electrochemical device, the method comprising:
a step A of stirring, while heating at a temperature of 50° C. or higher, a mixture including a non-aqueous solvent and an alkaline earth metal chloride, an amount of the alkaline earth metal chloride being 0.015 mol or more relative to 1 mol of the non-aqueous solvent; and
a step B of cooling to a temperature of 35° C. or lower, the mixture obtained in the step A, followed by further stirring, thereby to produce a non-aqueous electrolyte in which the alkaline earth metal chloride is dissolved in an amount of 0.015 mol or more relative to 1 mol of the non-aqueous solvent.

A further aspect of the present invention relates to a method of producing a non-aqueous electrolyte for an electrochemical device, the method comprising:
a step C of stirring, at a temperature of 35° C. or lower, a mixture including a non-aqueous solvent and magnesium chloride, the non-aqueous solvent including at least tetrahydrofuran, an amount of the magnesium chloride being 0.05 mol or more relative to 1 mol of the non-aqueous solvent, thereby to produce a non-aqueous electrolyte in the form of a meringue, the non-aqueous electrolyte including: an adduct comprising the tetrahydrofuran, and the magnesium chloride added to the tetrahydrofuran; and a solution comprising the tetrahydrofuran, and the magnesium chloride dissolved at a saturation concentration in the tetrahydrofuran.

A yet another aspect of the present invention relates to an electrochemical device comprising a first electrode, a second electrode differing from the first electrode in polarity, and the above non-aqueous electrolyte.

A still further aspect of the present invention relates to a negative electrode for an electrochemical device, the negative electrode comprising: a negative electrode current collector; and a deposit of a negative electrode active material including an alkaline earth metal and an alkaline metal, and being attached to a surface of the negative electrode current collector, the deposit being due to deposition on the surface of the negative electrode current collector, caused by passing of a cathodic current through the negative electrode current collector in a non-aqueous electrolyte, the non-aqueous electrolyte comprising: a non-aqueous solvent; and an alkaline earth metal chloride and an alkaline metal chloride both dissolved in the non-aqueous solvent, the alkaline earth metal chloride being dissolved in an amount of 0.015 mol or more relative to 1 mol of the non-aqueous solvent, and a total content of the non-aqueous solvent and the alkaline earth metal chloride being 70 mass % or more in the non-aqueous electrolyte.

Advantageous Effects of Invention

According to the above aspects of the present invention, since the molar proportion of the alkaline earth metal chloride dissolved is high with respect to the non-aqueous solvent, the non-aqueous electrolyte is able to have ion conductivity sufficient for the electrolyte to withstand use in an electrochemical device, and to also improve energy density in an electrochemical device.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 3 An electron microscope image of a tip end portion of a working electrode after the fourth scan in the cathode direction, in a cyclic voltammetry (CV) measurement performed for the solution of Sample No. 4 in Example 1

FIG. 4 A cyclic voltammogram for the solution of Sample No. 2 in Example 1, in which a working electrode made of silver is used FIG. 5 A cyclic voltammogram for a solution of Sample No. 6 in Comparative Example 2

FIG. 9 An electron microscope image of deposits on a surface of a working electrode made of iron, in a CV measurement for a solution of Sample No. 16 in Example 2, in which a lithium counter electrode is used FIG. 10 A graph showing a quantity of electricity conveyed in reduction (Qcathodic) and a quantity of electricity conveyed in oxidation (Qanodic) at a negative electrode in a lithium secondary battery subjected to repeated charge/discharge cycles, the negative electrode being an electrode having deposits thereon due to deposition caused in the solution of Sample No. 16 in Example 2

DESCRIPTION OF EMBODIMENTS

Non-Aqueous Electrolyte

Figure 1:
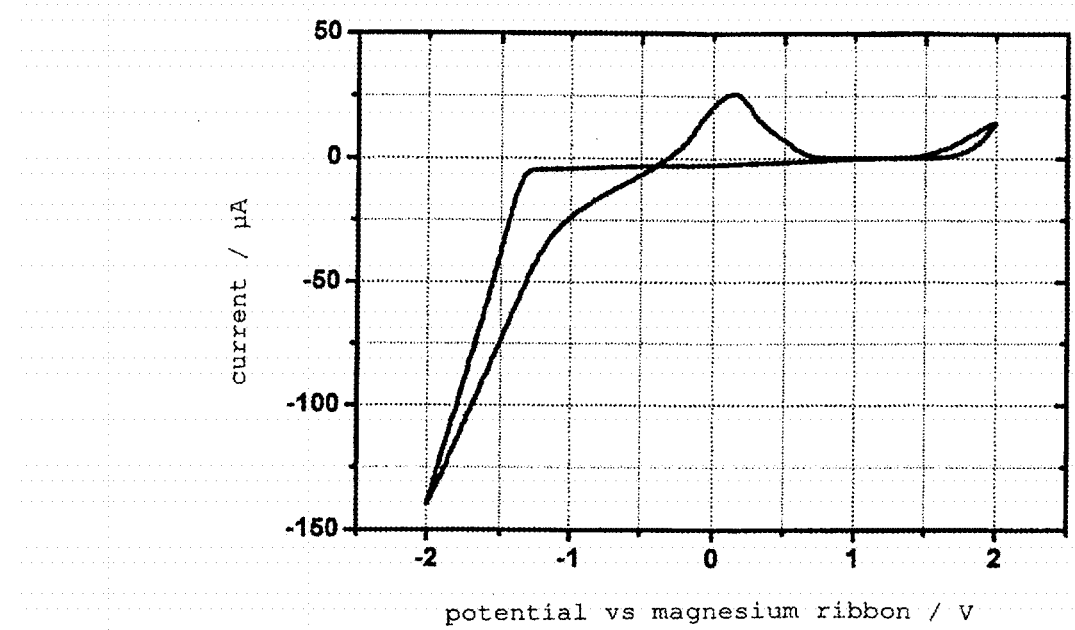
FIG. 1 A cyclic voltammogram for a solution of Sample No. 2 in Example 1, in which a working electrode made of iron is used FIG. 2 A cyclic voltammogram for a solution of Sample No. 4 in Example 1

According to an embodiment of the present invention, a non-aqueous electrolyte for an electrochemical device comprises a non-aqueous solvent and an alkaline earth metal chloride. The alkaline earth metal chloride is dissolved in an amount of 0.015 mol or more relative to 1 mol of the non-aqueous solvent. The total content of the non-aqueous solvent and the alkaline earth metal chloride is 70 mass % or more in the non-aqueous electrolyte.

Alkaline earth metal ions are divalent cations, and can therefore carry twice as much charge compared to monovalent cations such as lithium ions, in a solution with the same ion concentration. Therefore, expectation is high for development of a non-aqueous electrolyte which includes alkaline earth metal ions. Examples of a conventional alkaline earth metal salt considered usable as a supporting salt, include $Mg(ClO_4)_2$, $Mg(N(SO_2CF_3)_2)_2$, and $MgBr_2$.

Regarding $Mg(ClO_4)_2$ and $Mg(N(SO_2CF_3)_2)_2$, although solubility in a non-aqueous solvent is comparatively high, it is difficult to obtain ion conductivity that is equivalent to lithium ion conductivity in a lithium secondary battery or the like. Moreover, regarding a conventional alkaline earth metal salt, the large formula weight of the anions would cause increase in the amount of the non-aqueous electrolyte used; and therefore, its use is disadvantageous in terms of increasing the energy density in an electrochemical device.

Compared to a conventional alkaline earth metal salt, an alkaline earth metal chloride such as magnesium chloride has a comparatively small formula weight; and therefore, if it can be used as a supporting salt, the electrochemical device could presumably have a higher energy density. However, an alkaline earth metal chloride has low solubility in a non-aqueous solvent typically used in a non-aqueous electrolyte; and therefore, it is difficult to obtain a non-aqueous electrolyte which uses an alkaline earth metal chloride as a supporting salt and also exhibits high ion conductivity. The low solubility of an alkaline earth metal chloride is due to impurities (e.g., carbonates, oxides) having poor solubility in a non-aqueous solvent that are stably present on a surface of solids of the chloride and inhibit dissolution of the chloride within the solids.

In the embodiment of the present invention, it was found that increasing the solubility of the alkaline earth metal chloride in the non-aqueous solvent (or, alternatively, promoting dissolution thereof) was possible, by, for example, removing impurities on a surface of solids of the alkaline earth metal chloride, or, adding an alkaline metal chloride to the alkaline earth metal chloride. Moreover, it became evident that a mixture (encompassing solution) including the alkaline earth metal chloride dissolved at high concentrations can be obtained, and that such a mixture exhibits a high ion conductivity sufficient for the mixture to be used as the non-aqueous electrolyte for an electrochemical device.

As above, the non-aqueous electrolyte according to the embodiment of the present invention comprises the non-aqueous solvent and the alkaline earth metal chloride dissolved at high concentrations in the non-aqueous solvent; and therefore, has ion conductivity sufficient for causing an electrochemical reaction in an electrochemical device. Moreover, compared to a supporting salt conventionally used in a non-aqueous electrolyte, the alkaline earth metal chloride has a smaller formula weight; and its formula weight can also be made equal to that of a lithium salt used as a supporting salt in a lithium battery. Accordingly, the alkaline earth metal chloride can secure sufficient ion conductivity even if used in small amounts, and can also increase the volume occupied by the electrodes; and therefore, the energy density of an electrochemical device can be improved.

In a lithium secondary battery, at charge, deposits of lithium metal shaped like dendrites are formed; and these deposits may become the cause of internal short circuits between the positive and negative electrodes. Even when the battery uses a non-aqueous electrolyte including alkaline earth metal ions such as magnesium ions, dendrites including an alkaline earth metal may be formed on the electrode surface. Since an alkaline earth metal such as magnesium metal has greater hardness compared to lithium metal, it is likely to become the cause of internal short circuits if deposited in the shapes of needles and dendrites. For example, in a non-aqueous electrolyte including a magnesium salt such as $Mg(ClO_4)_2$, $Mg(N(SO_2CF_3)_2)_2$, $MgBr_2$, or the like, needle-shaped deposits including magnesium metal tend to be deposited.

However, in the non-aqueous electrolyte according to the embodiment of the present invention, even when an alkaline earth metal is deposited on the electrode surface, the resultant deposits tend to be in particle form. Therefore, these deposits are rarely the cause of internal short circuits between the positive and negative electrodes, in contrast to deposits in the shape of needles. In view of the above also, it is preferable to use a non-aqueous electrolyte including an alkaline earth metal chloride as a supporting salt.

Moreover, in the embodiment of the present invention, a non-aqueous electrolyte including an alkaline earth metal chloride dissolved at high concentrations can be obtained, even without using an aluminum complex which requires careful handling as in Patent Literature 2. In Patent Literature 2, unless an aluminum complex is added in large amounts, an alkaline earth metal chloride cannot be dissolved in a non-aqueous solvent. In contrast, in the embodiment of the present invention, an aluminum complex is not required, and therefore, the amount of the non-aqueous electrolyte used can be reduced. This is advantageous in terms of reducing weight and increasing energy density.

In the following, a more specific description will be given of the non-aqueous electrolyte.

In the non-aqueous electrolyte, the total content of the non-aqueous solvent and the alkaline earth metal chloride is 70 mass % or more, preferably 80 mass % or more, and further preferably 90 mass % or more, in the non-aqueous electrolyte as a whole. The upper limit of the proportion of the total content of the non-aqueous solvent and the alkaline earth metal chloride in the non-aqueous electrolyte is not particularly limited, and may be 100 mass %, or may be 99 mass % or 95 mass %. The upper and lower limits for this proportion can be combined arbitrarily. The above total content may be, for example, 70 to 100 mass %, or may be 70 to 95 mass %. As will be described later, when the non-aqueous electrolyte further comprises an alkaline metal chloride in addition to the non-aqueous solvent and the alkaline earth metal chloride, the total content of the non-aqueous solvent, the alkaline earth metal chloride, and the alkaline metal chloride may be, for example, 80 mass % or more, preferably 85 mass % or more, and further preferably 90 mass % or more, in the non-aqueous electrolyte as a whole.

When the total content of the non-aqueous solvent and the alkaline earth metal chloride (or the total content of the non-aqueous solvent, the alkaline earth metal chloride, and the alkaline metal chloride) is in the above range, the proportions of other components in the non-aqueous electrolyte are comparatively small; and therefore, the amount of the non-aqueous electrolyte used can be reduced, while high ion conductivity is secured. As the other components, additives, polymers (e.g., polyethylene oxides), and the like can be given.

In the non-aqueous electrolyte, the amount of the alkaline earth metal chloride dissolved is 0.015 mol or more, preferably 0.02 mol or more (e.g., 0.025 mol or more), and further preferably 0.03 mol or more, relative to 1 mol of the non-aqueous solvent. If the above amount is less than 0.015 mol, it would be difficult to obtain ion conductivity sufficient for the non-aqueous electrolyte to be used in an electrochemical device. The amount of the alkaline earth metal chloride dissolved is, for example, 0.07 mol or less, preferably 0.05 mol or less, and further preferably less than 0.05 mol, relative to 1 mol of the non-aqueous solvent. The upper limit of the above amount may correspond to the supersaturation concentration of the alkaline earth metal chloride in the non-aqueous electrolyte; but preferably corresponds to the saturation concentration thereof, or less, so that crystals of the alkaline earth metal chloride do not precipitate in the non-aqueous electrolyte. The upper and lower limits for the amount of the alkaline earth metal chloride dissolved can be combined arbitrarily. The amount of the alkaline earth metal chloride relative to 1 mol of the non-aqueous solvent may be, for example, 0.015 to 0.07 mol, or 0.02 mol or more and less than 0.05 mol.

As above, the non-aqueous electrolyte comprises the non-aqueous solvent and the alkaline earth metal chloride dissolved at high concentrations in the non-aqueous solvent. The alkaline earth metal chloride that has dissolved dissociates into alkaline earth metal ions (cations) and chloride ions (anions). When the non-aqueous electrolyte is used in an electrochemical device, the alkaline earth metal ions are deposited as an alkaline earth metal on the electrode surface; and are eluted from the alkaline earth metal. Moreover, depending on the kind of electrode active material and the kind of other cations included in the non-aqueous electrolyte, the alkaline earth metal ions form an alloy on the electrode surface; and are eluted from the alloy. That is, when the above non-aqueous electrolyte including the alkaline earth metal ions is used in an electrochemical device, an electrochemical reaction is made possible therein. Depending on the kind of other cations included in the non-aqueous electrolyte, in the non-aqueous electrolyte, the alkaline earth metal ions carry out an electrochemical reaction at the electrode, thereby enabling the non-aqueous electrolyte to have alkaline earth metal ion conductivity.

The non-aqueous electrolyte may be a solution.

Moreover, when the non-aqueous solvent and the alkaline earth metal chloride in an amount corresponding to its saturation concentration or higher are mixed under predetermined conditions, a semisolid mixture including an adduct and a solution may be obtained, the adduct comprising the non-aqueous solvent, and the alkaline earth metal chloride added to the non-aqueous solvent; and the solution comprising the non-aqueous solvent, and the alkaline earth metal chloride dissolved in the non-aqueous solvent. Such a semisolid mixture, as with such a solution, includes a large number of alkaline earth metal ions, and therefore exhibits high ion conductivity. Moreover, when the mixture is used in an electrochemical device, an alkaline earth metal can be deposited on the electrode surface, and can also be re-dissolved at the electrode surface. Thus, such a semisolid mixture can also be used as the non-aqueous electrolyte.

In the present specification, the term semisolid means a state where a solid adduct and a solution are both present, and it indicates a non-gelled state. In the semisolid non-aqueous electrolyte, the non-aqueous solvent becomes added to the alkaline earth metal chloride particles that do not dissolve and thus remain in the non-aqueous solvent, and as a result, expanded products are obtained; and a solution comprising the non-aqueous solvent and the alkaline earth metal chloride dissolved therein, is retained between the expanded products and on a surface of the expanded products. The above semisolid non-aqueous electrolyte is preferably in the form of a slurry or meringue. Compared to using a solution, using the semisolid non-aqueous electrolyte is unlikely to cause internal short circuits. Note that the solid adduct is formed by the process of stirring the alkaline earth metal chloride in the mixture comprising the alkaline earth metal chloride and the non-aqueous solvent. In the mixture, the particles of the solid adduct aggregate and form soft masses like cotton and snow.

The amount of the alkaline earth metal chloride in the semisolid non-aqueous electrolyte is, for example, 0.04 mol or more and preferably 0.05 mol or more, relative to 1 mol of the non-aqueous solvent. In the semisolid non-aqueous electrolyte, the amount of the alkaline earth metal chloride relative to 1 mol of the non-aqueous solvent is, for example, 0.7 mol or less and preferably 0.6 mol or less. For the above, the lower limit and the upper limit may be combined arbitrarily. The amount of the alkaline earth metal chloride in the semisolid non-aqueous electrolyte may be 0.04 to 0.7 mol, or 0.05 to 0.6 mol, relative to 1 mol of the non-aqueous solvent. When the amount of the alkaline earth metal chloride in the non-aqueous electrolyte is in the above range, sufficient ion conductivity can be easily secured and production of needle-shaped deposits of the alkaline earth metal can be effectively suppressed.

The above adduct may be a compound in which, for example, 1 to 6 molecules, or 1.2 to 5 molecules, of the non-aqueous solvent is added to 1 molecule of the alkaline earth metal chloride. When the number of molecules of the non-aqueous solvent added to 1 molecule of the alkaline earth metal chloride is in the above range, the adduct can become a solid and the non-aqueous electrolyte can easily take a semisolid form.

Examples of the alkaline earth metal chloride in the non-aqueous electrolyte include chlorides of the Group 2 elements of the Periodic Table, those preferred being magnesium chloride ($MgCl_2$), calcium chloride, strontium chloride, and barium chloride. These alkaline earth metal chlorides may be used singly or in a combination of two or more. Preferred among these chlorides are magnesium chloride and calcium chloride, due to their small formula weights.

The alkaline earth metal chloride preferably includes at least magnesium chloride. The proportion of the magnesium chloride in the alkaline earth metal chloride is, for example 80 mol % or more, and preferably 90 mol % or more or 95 mol % or more. Alternatively, the alkaline earth metal chloride may be the magnesium chloride itself (i.e., the alkaline earth metal chloride may comprise 100 mol % of the magnesium chloride).

Examples of the non-aqueous solvent include ethers, carbonates, carboxylic acid esters, nitriles (e.g., aliphatic nitriles such as acetonitrile, propionitrile, and adiponitrile), sulfoxides (e.g., dimethylsulfoxide), and pyrrolidones (e.g., N-methyl-2-pyrrolidone). Alternatively, the non-aqueous solvent may be an ionic liquid. These non-aqueous solvents may be used singly or in a combination of two or more. Preferred among these non-aqueous solvents are ethers, carbonates, and carboxylic acid esters.

Examples of an ether include: cyclic ethers (e.g., cyclic ethers having 1 or 2 oxygen atoms) such as tetrahydrofuran (THF), 2-methyltetrahydrofuran, 3-methyltetrahydrofuran, 2,5-dimethyltetrahydrofuran, 1,3-dioxolan, 2-methyl-1,3-dioxolan, tetrahydropyran, and 2-methyl-tetrahydropyran; and chain ethers. Examples of a chain ether include: dialkyl ethers (e.g., $diC_{1-6}$alkyl ethers) such as diethyl ether and methyl butyl ether; dialkoxyalkane (e.g., $diC_{1-4}$alkoxy$C_{1-4}$ alkanes) such as 1,2-dimethoxyethane, 1-methoxy-2-ethoxyethane, and 1,2-diethoxyethane; glymes such as diglyme, triglyme, and tetraglyme; and polyethylene glycol having aprotic ends.

The above ethers may be used singly or in a combination of two or more. Preferred among these ethers are cyclic ethers, and preferred among the cyclic ethers are 5- to 8-membered cyclic ethers (preferably 5- to 6-membered cyclic ethers) having 1 or 2 oxygen atoms, particularly THF, or THF having a substituent group (e.g., $C_{1-4}$alkyl group) such as 2-methyltetrahydrofuran.

Examples of a carbonate include: cyclic carbonates; and chain carbonates (e.g., $diC_{1-6}$alkyl carbonates) such as dimethyl carbonate (DMC), ethyl methyl carbonate, diethyl carbonate, methyl propyl carbonate, methyl butyl carbonate, and methyl pentyl carbonate. Examples of a cyclic carbonate include: alkylene carbonates (e.g., $C_{2-5}$alkylene carbonates) such as ethylene carbonate (EC), propylene carbonate (PC), and butylene carbonate; alkylene carbonates having fluorine atoms (e.g., fluoro($C_{2-5}$alkylene) carbonates) such as fluoroethylene carbonate; and cyclic carbonates having unsaturated bonds such as vinylene carbonate and vinylethylene carbonate. These carbonates may be used singly or in a combination of two or more. Preferred among the above are cyclic carbonates, particularly PC.

Examples of a carboxylic acid ester include: cyclic carboxylic acid esters such as γ-butyrolactone, α-methyl-γ-butyrolactone, γ-valerolactone, furanone, 3-methyl-2(5H)-furanone, and α-angelicalactone; and chain carboxylic acid esters such as ethyl acetate. Preferred among the above are cyclic carboxylic acid esters.

An ionic liquid is a salt of a cation and an anion, and is a liquid when in a molten state. The ionic liquid is preferably in a molten state at operating temperatures of an electrochemical device.

For the cations in the ionic liquid, organic onium ions including a nitrogen atom, a phosphorous atom, and a sulfur atom can be given as examples. For organic onium ions including a nitrogen atom, quaternary ammonium ions and cyclic nitrogen-containing onium ions can be given as examples.

For quaternary ammonium ions, aliphatic quaternary ammonium ions can be given, examples thereof including: tetraalkylammonium ions (e.g., tetra$C_{1-10}$alkylammonium ions) such as tetraethylammonium ion, tetrabutylammonium ions, tetraoctylammonium ions, and triethylmethylammonium ion; and trialkyl-alkoxyalkylammonium ions (e.g., tri($C_{1-10}$ alkyl)-$C_{1-4}$alkoxy$C_{1-6}$alkylammonium ions) such as diethylmethyl-2-methoxyethylammonium ions. For cyclic nitrogen-containing onium ions, pyrrolidinium ions such as spiro-(1,1)-bipyrrolidinium ions (($C_4H_8)_2N^+$) and butylmethylpyrrolidinium ions (($C_4H_9)(CH_3)(C_4H_8)N^+$); and piperidinium ions such as propylmethylpiperidinium (($C_3H_7)(CH_3)(C_5H_{10})N^+$), can be given as examples.

For organic onium ions including a phosphorous atom, organic phosphonium ions, i.e., the above quaternary ammonium ions in which nitrogen atoms are replaced with phosphorous atoms, can be given as examples.

For organic onium ions including a sulfur atom, trialkylsulfonium ions (e.g., tri$C_{4-40}$alkylsulfonium ions) such as trimethylsulfonium ion and dimethylethylsulfonium ions, can be given as examples.

The ionic liquid may include one kind of these cations, or two or more kinds of these cations in a combination.

For the anions in the ionic liquid, $PF_6^-$, $BF_4^-$, $ClO_4^-$, perfluoroalkylsulfonic acid ions (e.g., trifluoromethylsulfonic acid ions ($CF_3SO_3^-$), and sulfonylimide ions can be given as examples. Preferred among the above are sulfonylimide ions, specific examples thereof including: chain sulfonylimide ions such as $(FSO_2)_2N^-$, $(FSO_2)(CF_3SO_2)N^-$, $(CF_3SO_2)_2N^-$, $(C_1F_5SO_2)_2N^-$, $(CF_3SO_2)(C_4F_9SO_2)N^-$ and $(CF_3SO_2)(CF_3CO)N^-$; and cyclic sulfonylimide ions such as $(CF_2SO_2)_2N^-$ having 5-membered rings and $CF_2(CF_2SO_2)_2N^-$ having 6-membered rings. The ionic liquid may include one kind of these anions, or two or more kinds of these anions in a combination.

Preferred among the above examples of the non-aqueous solvent, is at least one selected from the group consisting of ethers and carbonates. Moreover, in a preferred form, the non-aqueous solvent includes at least a cyclic carbonate or THF. The cyclic carbonate preferably includes at least PC. An alkaline earth metal chloride such as magnesium chloride has low solubility in a non-aqueous solvent such as that given above (particularly in an ether such as THF), and does not easily dissolve at high concentrations therein. However, according to the embodiment of the present invention, even when the above non-aqueous solvent is used, the solubility of the alkaline earth metal chloride can be increased, and high ion conductivity can be secured.

When the non-aqueous solvent includes at least THF, the THF content in the non-aqueous solvent is, for example, 60 mol % or more, preferably 80 mol % or more, and further preferably 90 mol % or more. Alternatively, the THF content in the non-aqueous solvent may be, for example, 99 mol % or less, or, the non-aqueous solvent may comprise only the THF. When the non-aqueous solvent includes at least PC, the PC content in the non-aqueous solvent is, for example, 60 mol % or more, preferably 80 mol % or more, and further preferably 90 mol % or more. Alternatively, the PC content in the non-aqueous solvent may be, for example 99 mol % or less, or, the non-aqueous solvent may comprise only the PC.

In a lithium battery and a lithium ion capacitor, high ion conductivity is obtained due to lithium ions serving as carriers. However, in an electrochemical device in which lithium ions serve as carriers, a lithium salt used as a supporting salt in a non-aqueous electrolyte include, as anions, $PF_6^-$, $BF_4^-$, $ClO_4^-$, $N(SO_2CF_3)_2^-$, or the like. Compared to these anions, chloride ion, i.e., $Cl^-$, have small formula weight. Therefore, if a chloride can be used as a supporting salt, it would be easy to reduce the amount of the non-aqueous electrolyte used. However, an alkaline metal chloride such as lithium chloride has low solubility in a non-aqueous solvent typically used in a non-aqueous electrolyte. Therefore, as with an alkaline earth metal chloride, an alkaline metal chloride does not easily dissolve at high concentrations in a non-aqueous solvent, and its use as a supporting salt would be difficult.

As above, seen individually, each of an alkaline earth metal chloride and an alkaline metal chloride has a low solubility in a non-aqueous solvent. However, it has become evident that combining an alkaline earth metal chloride and an alkaline metal chloride causes their respective solubilities to increase and thus enable each of the chlorides to dissolve at high concentrations in a non-aqueous solvent, resulting in obtaining high ion conductivity therein.

Therefore, in an embodiment of the present invention, the non-aqueous electrolyte can further comprise an alkaline metal chloride that is dissolved in the non-aqueous solvent. In the non-aqueous electrolyte, the presence of both the alkaline earth metal chloride and the alkaline metal chloride promotes individual dissolution of each of the chlorides (dissolution of the alkaline metal chloride, in particular) and enables obtaining an ion concentration (and ion conductivity) sufficient for the chlorides to act as an electrolyte salt. The alkaline metal chloride has very low solubility in the non-aqueous solvent comprising an ether, a carbonate, a carboxylic acid ester, or the like; however, by allowing it to be present with the alkaline earth metal chloride, each of the chlorides can have higher solubility even when the above non-aqueous solvent is used, and ion conductivity sufficient for the non-aqueous electrolyte to function, can be secured.

Examples of the alkaline metal chloride include lithium chloride, sodium chloride, potassium chloride, rubidium chloride, cesium chloride, and francium chloride. These alkaline metal chlorides may be used singly or in a combination of two or more. Among these chlorides, lithium chloride, sodium chloride, and potassium chloride are preferred due to their small formula weights. In particular, the alkaline metal chloride preferably includes at least lithium chloride. The lithium chloride content in the alkaline metal chloride is preferably 90 mol % or more, and may be 95 mol % or more.

In the non-aqueous electrolyte including both the alkaline earth metal chloride and the alkaline metal chloride, ions of at least one of an alkaline earth metal and an alkaline metal serve as charge carriers. The kind of ions to serve as the carriers depends on the kind of the non-aqueous solvent. For example, when the non-aqueous solvent includes a carbonate, a carboxylic acid ester, or the like in large amounts, alkaline metal ion conductivity tends to be predominant; and when the non-aqueous solvent includes an ether in large amounts, alkaline earth metal ion conductivity tends to be predominant. By appropriately selecting the kind and composition of the non-aqueous solvent as well as the kinds and compositions of the chlorides, the kind of ions to serve as the carriers can be controlled. Therefore, the above non-aqueous electrolyte, despite its simple composition, can also be applied to an electrochemical device that use either an alkaline metal or an alkaline earth metal as an electrode active material.

In the non-aqueous electrolyte, the amount of the alkaline metal chloride dissolved is, for example, 0.001 mol or more, preferably 0.005 mol or more, and further preferably 0.01 mol or more, relative to 1 mol of the non-aqueous solvent; and is, for example, 0.05 mol or less, preferably 0.045 mol or less, and further preferably 0.04 mol or less, relative to 1 mol of the non-aqueous solvent. For the above, the lower limit and the upper limit may be combined arbitrarily. The amount of the alkaline metal chloride dissolved relative to 1 mol of the non-aqueous solvent may also be, for example, 0.001 to 0.05 mol or 0.005 to 0.045 mol. When the amount of the alkaline metal chloride in the non-aqueous solvent is in the above range, it is easy for each of the alkaline earth metal chloride and the alkaline metal chloride to dissolve at high concentrations in the non-aqueous solvent, although this would depend on the amount of the alkaline earth metal chloride.

The amount of the alkaline metal chloride relative to 1 mol of the alkaline earth metal chloride, for example, can be selected from a range of 0.1 to 3 mol; and is preferably 0.2 to 2.5 mol and further preferably 0.3 to 2.2 mol. For example, when the non-aqueous solvent includes a carbonate and/or carboxylic acid ester in an amount exceeding 50 mol %, the amount of the alkaline metal chloride relative to 1 mol of the alkaline earth metal chloride is preferably 0.2 to 1.5 mol and further preferably 0.3 to 1.2 mol. Moreover, for example, when the non-aqueous solvent includes an ether in an amount exceeding 50 mol %, the alkaline metal chloride can be dissolved in comparatively large amounts; and the amount of the alkaline metal chloride relative to 1 mol of the alkaline earth metal chloride is, for example, 0.4 to 2.5 mol, and may be 0.5 to 2.3 mol. When the amount of the alkaline metal chloride relative to the alkaline earth metal chloride is in the above range, it is easy to promote dissolution of each of the chlorides in the non-aqueous solvent.

In the following, specific examples (a) to (c) are given to describe preferred embodiments of the non-aqueous electrolyte.

In a preferred embodiment (a), the non-aqueous electrolyte comprises: a non-aqueous solvent including at least THF; and an alkaline earth metal chloride including magnesium chloride.

On a surface of solids of magnesium chloride, there are impurities with poor solubility in a non-aqueous solvent such as magnesium carbonate and magnesium oxide; and these impurities inhibit dissolution of the magnesium chloride that is within the solids of the magnesium chloride. Thus, magnesium chloride has low solubility in a non-aqueous solvent such as THF. In the embodiment (a), the impurities on the surface of the solids of the magnesium chloride are removed by a method to be described later, so as to promote dissolution of the magnesium chloride into the non-aqueous solvent, thereby enabling obtaining a non-aqueous electrolyte in which magnesium chloride is dissolved at high concentrations.

The non-aqueous electrolyte includes the magnesium chloride, and as necessary, can further include an alkaline earth metal chloride other than the magnesium chloride, selected from the above examples given for the alkaline earth metal chloride. When the non-aqueous electrolyte includes the magnesium chloride and the another alkaline earth metal chloride, it is advantageous in terms of increasing solubility of the magnesium chloride.

The non-aqueous electrolyte can include a component other than the alkaline earth metal chloride and the non-aqueous solvent. However, in terms of oxidation resistance, the non-aqueous electrolyte preferably does not include an alkaline earth metal bromide, e.g., magnesium bromide, strontium bromide, and barium bromide. Moreover, in terms of allowing efficient deposition and dissolution of magnesium metal at an electrolyte in an electrochemical device, the non-aqueous electrolyte preferably does not include a perfluoroalkylsulfonylimide salt such as $Mg(N(SO_2CF_3)_2)_2$.

The non-aqueous solvent can include, in addition to the THF, another solvent (selected from the above examples given for the non-aqueous solvent, excluding THF). The non-aqueous solvent preferably does not include another solvent, and even when it does include another solvent, the content of the another solvent is preferably small. The THF content in the non-aqueous solvent can be selected from the range given above, and may be 95 mol % or more.

In the non-aqueous electrolyte of the embodiment (a), the amount of the alkaline earth metal chloride (including magnesium chloride) dissolved relative to 1 mol of the non-aqueous solvent can be selected from the above range, but is preferably 0.025 mol or more and particularly preferably 0.03 mol or more. When the amount of the alkaline earth metal chloride dissolved is in the above range, there is a high concentration of alkaline earth metal ions such as magnesium ions in the non-aqueous electrolyte; and therefore, it is advantageous in securing high ion conductivity.

The non-aqueous electrolyte of the embodiment (a) is preferably a solution. Therefore, the amount of the magnesium chloride dissolved preferably corresponds to the saturation concentration of the alkaline earth metal chloride. The non-aqueous electrolyte of the embodiment (a) exhibits high magnesium ion conductivity, since it includes magnesium ions at high concentrations due to dissolution of the magnesium chloride therein.

In a preferred embodiment (b), the non-aqueous electrolyte comprises: a non-aqueous solvent; and an alkaline earth metal chloride and an alkaline metal chloride that are dissolved in the non-aqueous solvent. The amount of each of the chlorides dissolved can be selected from the ranges given above.

The alkaline earth metal chloride preferably includes at least magnesium chloride. The alkaline metal chloride preferably includes at least lithium chloride. When the lithium chloride is used, and is combined with the magnesium chloride, solubilities of both of the chlorides can be greatly increased.

An alkaline metal chloride such as lithium chloride has low solubility in an organic solvent typically used as a non-aqueous solvent in a non-aqueous electrolyte; and therefore, it is difficult to dissolve an alkaline metal chloride in a non-aqueous solvent, at concentrations sufficient for the resultant to serve as a non-aqueous electrolyte. Lithium chloride can be dissolved with use of a phosphoric ester such as triethyl phosphate as a solvent. However, it is difficult to use the resultant solution as a non-aqueous electrolyte, since it is reduced and decomposed due to an alkaline metal or alkaline earth metal used as an electrode active material in an electrochemical device.

In the embodiment (b), as described above, the presence of both the alkaline earth metal chloride and the alkaline metal chloride causes interaction between the two chlorides, thereby enabling increase in their respective solubilities.

This enables obtaining a solution which includes the chlorides at concentrations sufficient for the solution to be used as the non-aqueous electrolyte. In particular, since the magnesium chloride and the lithium chloride both have a small formula weight, their use enables reduction in the amount of the non-aqueous electrolyte used and facilitates increase in the energy density in an electrochemical device.

In the embodiment (b), the non-aqueous solvent is preferably at least one selected from the group consisting of ethers and carbonates. The ethers preferably include at least cyclic ethers (THF, in particular), and the carbonates preferably include at least cyclic carbonates (PC, in particular).

The non-aqueous electrolyte of a preferred embodiment (c), which is in the form of a semisolid (in the form of a meringue, in particular), comprises: a solid adduct comprising magnesium chloride, and THF added to the magnesium chloride; and a solution comprising THF, and magnesium chloride dissolved in the THF.

In the embodiment (c), the amount of the magnesium chloride relative to 1 mol of the THF can be selected from the range given above with respect to the semisolid non-aqueous electrolyte, for the amount of the alkaline earth metal chloride relative to 1 mol of the non-aqueous solvent; and is preferably 0.05 to 0.7 mol or 0.05 to 0.6 mol.

Regarding the adduct, the number of molecules of the THF added to one molecule of the magnesium chloride can be selected from the range given above for the number of molecules of the non-aqueous solvent added to one molecule of the alkaline earth metal chloride; and is preferably 1.5 to 4.5 molecules or 1.5 to 4 molecules.

In the non-aqueous electrolyte of the embodiment (c), the non-aqueous solvent can include, in addition to the THF, another solvent (selected from the above examples given for the non-aqueous solvent, excluding THF), as long as the non-aqueous electrolyte is in semisolid form. The THF content in the non-aqueous solvent can be selected from the range given above, and may be 95 mol % or more.

The non-aqueous electrolyte according to the embodiments of the present invention has high ion conductivity and can increase energy density; and therefore, can be used as a non-aqueous electrolyte in various electrochemical devices (e.g., electrochemical energy storage devices), examples thereof including: batteries such as primary batteries and secondary batteries; and capacitors (e.g., hybrid capacitors). Moreover, as will be described later, the non-aqueous electrolyte can cause an oxidation-reduction reaction when an electrode made of a metal/metal chloride is used; and therefore, can also be used as a highly reliable non-aqueous electrolyte for a reference electrode, such a non-aqueous electrolyte being in demand for the development of electrochemical devices. The non-aqueous electrolyte, despite including alkaline earth metal ions at high concentrations, can be prepared with stability; and therefore, is effective in obtaining an electrochemical device with high energy density and high reliability.

(Method for Preparing Non-Aqueous Electrolyte)

In the following, a method for preparing a non-aqueous electrolyte will be described with reference to a preferred embodiment given as one example. Note that the non-aqueous electrolyte is preferably produced under an atmosphere of inert gas (e.g., nitrogen gas, argon gas).

In an embodiment (embodiment (d)) of the present invention, a non-aqueous electrolyte can be produced by carrying out:

a step A of stirring, while heating at a temperature of 50° C. or higher, a mixture including a non-aqueous solvent and an alkaline earth metal chloride, the chloride being in an amount of 0.015 mol or more relative to 1 mol of the non-aqueous solvent; and a step B of cooling the mixture obtained in the step A to a temperature of 35° C. or lower, followed by further stirring, thereby to produce a non-aqueous electrolyte in which the alkaline earth metal chloride is dissolved in an amount of 0.015 mol or more relative to 1 mol of the non-aqueous solvent.

In the embodiment (d), by the step A in which the mixture is stirred while being heated, solids of the alkaline earth metal chloride rub against one another, and impurities with poor solubility that are present on a surface of the solids are removed. Due to the removal of the impurities from the surface, in the subsequent step B, the alkaline earth metal chloride can be dissolved in the non-aqueous solvent at a temperature of 35° C. or lower. Thus, even without using an aluminum complex which needs careful handling as in Patent Literature 2, the alkaline earth metal chloride can be dissolved at high concentrations in the non-aqueous solvent; and therefore, a non-aqueous electrolyte with sufficiently high concentration of alkaline earth metal ions can be prepared.

The temperature in the step A is 50° C. or higher, and is preferably 55° C. or higher and further preferably 60° C. or higher. The temperature in the step A is the decomposition temperature of the non-aqueous solvent or lower, and preferably the boiling temperature of the non-aqueous solvent or lower. The stirring time in the step A is, for example, 10 to 60 hours and preferably 12 to 48 hours.

The alkaline earth metal chloride, from which the impurities at the surface are removed in the step A, is further stirred in the step B and thus dissolved in the non-aqueous solvent.

The temperature in the step B is specifically 35° C. or lower, and preferably room temperature (about 20 to 35° C.) and further preferably 30° C. or lower (e.g., 20 to 30° C.)

The stirring time in the step B is, for example, 24 to 150 hours, and preferably 48 to 100 hours and further preferably 60 to 90 hours.

When the mixture obtained in the step B still includes the impurities with poor solubility, the impurities are removed by using a filter, thereby to enable obtaining a non-aqueous electrolyte in the form of a solution, in which the alkaline earth metal chloride is dissolved in the non-aqueous solvent.

The production method of the embodiment (d) is suited for use when producing a non-aqueous electrolyte in the form of a solution and not including an alkaline metal chloride; and is effective, for example, when producing the non-aqueous electrolyte of the embodiment (a).

In an embodiment (embodiment (e)) of the present invention, a semisolid non-aqueous electrolyte can be obtained by carrying out a step C of stirring, at a temperature of 35° C. or lower, a mixture including a non-aqueous solvent and an alkaline earth metal chloride, the chloride being in an amount which corresponds to its saturation concentration or higher, thereby to produce a non-aqueous electrolyte.

In the step C, the non-aqueous solvent is coordinated to solids (particles) of the alkaline earth metal chloride that do not dissolve and are thus present in the mixture; and as a result, expanded products are obtained. Then, through stirring, the solution, which comprises the non-aqueous solvent and the alkaline earth metal chloride dissolved therein, is retained between the expanded products and on a surface of the expanded products. Thus, the non-aqueous electrolyte having both the solid adduct and the solution therein, becomes semisolid. By air bubbles entering the mixture while being stirred, the resultant non-aqueous electrolyte expands due to the air bubbles therein and thus becomes meringue-like.

In the step C, the temperature during stirring is specifically 35° C. or lower, and preferably room temperature (about 20 to 35° C.) and further preferably 30° C. or lower (e.g., 20 to 30° C.).

Stirring can be carried out by a known method, for example, a stirring method using a stir bar or a stir blade. Stirring is preferably carried out at a rate that is as slow as possible; and the stir rate is, for example, 70 to 200 rpm and preferably 80 to 150 rpm. For example, when stirring is by a magnetic stirrer and a rotator, it is preferably carried out at the lowest possible rate at which the mixture of the solvent and the alkaline earth metal chloride can be stirred.

The production method of the embodiment (e) is useful in producing the semisolid non-aqueous electrolyte of the embodiment (c).

In an embodiment (embodiment (f)) of the present invention, a non-aqueous electrolyte can be produced by carrying out a step D of stirring, while heating at a temperature of 50° C. or higher, a mixture including: a non-aqueous solvent; an alkaline earth metal chloride, the chloride being in an amount of 0.015 mol relative to 1 mol of the non-aqueous solvent; and an alkaline metal chloride, thereby to produce a non-aqueous electrolyte in which the alkaline earth metal chloride and the alkaline metal chloride are both dissolved in the non-aqueous solvent, the alkaline earth metal chloride being in amount of 0.015 mol or more relative to the non-aqueous solvent.

In the step D, heating enables the alkaline earth metal chloride to easily dissolve in the non-aqueous solvent. Under this condition, the alkaline metal chloride interacts with the alkaline earth metal chloride via chloride ions, and is thus able to easily dissolve in the non-aqueous solvent. As above, the dissolution efficiency of the supporting salt can be increased.

In the step D, the heating temperature is 50° C. or higher, and preferably 55° C. or higher or 60° C. or higher. The heating temperature is the decomposition temperature of the non-aqueous solvent or lower, and preferably the boiling temperature of the non-aqueous solvent or lower.

The heating time is, for example, 10 to 48 hours and preferably 12 to 36 hours. In the embodiment (f), due to the alkaline metal chloride being included in addition to the alkaline earth metal chloride, both of the chlorides can be dissolved at high concentrations, even if a long-time stirring, as in the step B for the embodiment (d), is not carried out after the initial heating and stirring. The above production method of the embodiment (f) is suited for use in producing the non-aqueous electrolyte of the embodiment (b).

In the embodiments (d) to (f), the alkaline earth metal chloride used is preferably in the form of particles such as beads (in the shape of spheres, spheroids, columns, or the like), so that the impurities on the surface of such solids of the alkaline earth metal chloride can come off easily.

The average particle size of the alkaline earth metal chloride in the form of particles is, for example, preferably in the range of 0.1 to 2 mm, and further preferably in the range of 0.5 to 1.8 mm. Note that, as an alternative, a volume-based particle size distribution $D_{50}$ value in the above range may be used.

(Electrochemical Device)

An electrochemical device according to an embodiment of the present invention comprises: a first electrode; a second electrode differing from the first electrode in polarity; and the above non-aqueous electrolyte.

The above non-aqueous electrolyte is capable of causing an oxidation-reduction reaction at surfaces of the electrodes. Therefore, for at least one of the first electrode and the second electrode, it is preferable to use an electrode through which a Faradaic current relevant to an oxidation-reduction reaction can flow. Examples of the preferred electrochemical device which uses such an electrode include: a non-aqueous electrolyte battery in which each of the first electrode and the second electrode is an electrode through which a Faradaic current can flow; and a hybrid capacitor in which the first electrode (positive electrode) is a polarized electrode, and the second electrode (negative electrode) is an electrode through which a Faradaic current can flow.

The non-aqueous electrolyte includes alkaline earth metal ions, and, as necessary, alkaline metal ions; and thus exhibits alkaline earth metal ion conductivity and/or alkaline metal ion conductivity. Due to the above, the non-aqueous electrolyte is suited for combination with an electrode which uses an electrode active material capable of causing deposition/dissolution and alloying/dealloying of an alkaline earth metal and/or an alkaline metal, an electrode active material capable of causing intercalation/deintercalation of alkaline earth metal ions and/or alkaline metal ions, or the like. Moreover, the non-aqueous electrolyte includes chloride ions; and therefore, when a positive electrode including a metal chloride as an active material is used, an oxidation-reduction reaction, by which a simple substance of metal is formed and thus a metal chloride is reproduced, can be carried out at the positive electrode during charge and discharge. Therefore, the non-aqueous electrolyte can be used in a combination with a positive electrode which uses a metal chloride.

Examples of an electrochemical device include a non-aqueous electrolyte battery and a hybrid capacitor; and the non-aqueous electrolyte battery may be either a primary battery or a secondary battery. Since an oxidation-reduction reaction which uses a non-aqueous electrolyte is reversible, a non-aqueous electrolyte is suited for use in electrochemical devices such as a non-aqueous electrolyte secondary battery and a hybrid capacitor. Since these electrochemical devices do not cause loss of low oxidation-reduction potential or high capacity of an alkaline earth metal such as magnesium, they can be electrochemical energy storage devices with high energy density.

(Negative Electrode)

The negative electrode (second electrode) used in the electrochemical device, e.g., a non-aqueous electrolyte battery and a hybrid capacitor, includes the following as a negative electrode active material: a simple substance or alloy of an alkaline earth metal (e.g., an alloy comprising two or more alkaline earth metals; an alloy comprising an alkaline earth metal and an alkaline metal (e.g., such in which the alkaline earth metal content is 50 atom % or more)); an intermetallic compound including an alkaline earth metal element (e.g., an intermetallic compound comprising magnesium, bismuth and/or tin); a carbonaceous material; or the like. When an alloy is used as the negative electrode active material, in terms of easy electrochemical deposition and dissolution of the alkaline earth metal, it is preferably an alloy comprising an alkaline earth metal and an alkaline metal such as a magnesium-lithium alloy.

The negative electrode active material can be selected in accordance with the kind of a chloride included in the non-aqueous electrolyte. When the non-aqueous electrolyte includes an alkaline metal chloride, the following can be used as the negative electrode active material: a simple substance or alloy of an alkaline metal (e.g., an alloy comprising two or more alkaline metals; an alloy comprising an alkaline metal and an alkaline earth metal (e.g., such in which the alkaline metal content exceeds 50 atom %)); or the like.

When a simple metal substance or an alloy is used as the negative electrode active material, it preferably comprises a metal of the same kind as that of metal ions (in particular, metal ions which serve as charge carriers) included in the non-aqueous electrolyte. For example, when the non-aqueous electrolyte used includes magnesium chloride, the negative electrode active material used can be magnesium metal, a magnesium alloy, or the like. Moreover, when the non-aqueous electrolyte used includes magnesium chloride and lithium chloride, the negative electrode active material used can be magnesium metal, lithium metal, a magnesium or lithium alloy (e.g., magnesium-lithium alloy), or the like.

Examples of a carbonaceous material used as the negative electrode active material include: carbonaceous materials including a highly crystalline region such as of a graphite structure; hard carbons and soft carbons; amorphous carbon materials; nanocarbons (e.g., monolayer or multilayer carbon nanotubes); and activated carbons. Also usable as the negative electrode active material, are products in which alkaline earth metal ions and/or alkaline metal ions are embedded within the structures of these carbonaceous materials (e.g., an intercalation compound in which alkaline earth metal ions are intercalated in a graphite structure; a compound in which alkaline earth metal ions are included in an amorphous carbon material, etc.). During charge and discharge, these carbonaceous materials absorb and release carrier ions such as the alkaline earth metal ions and/or the alkaline metal ions.

Examples of a carbonaceous material including a highly crystalline region include: graphites (e.g., natural graphite, artificial graphite); graphitizable mesophase carbons; and vapor-deposited carbon materials.

The carbonaceous material may be in the form of particles or fibers. Examples of the carbonaceous material in the form of fibers include graphite fibers and vapor-deposited carbon fibers.

The above negative electrode active materials may be used singly or in a combination of two or more. The negative electrode may include a negative electrode material mixture. The negative electrode material mixture can include the negative electrode active material and optional components such as a conductive agent, a binder, and/or a thickener. When a simple substance of metal or an alloy is used as the negative electrode active material, a foil or plate-like body of the metal or the alloy can be used as the negative electrode.

The negative electrode material mixture may be, for example, the following: a powder mixture including a simple substance of metal or an alloy, in powder form, as the negative electrode active material, and a conductive agent; a mixture including the negative electrode active material, and components such as a conductive agent, a binder, and as necessary, a thickener; or the like. A current collector may be inserted into the former powder mixture for the resultant to be used as the negative electrode; or the latter mixture may be molded as appropriate to form the negative electrode. In forming the negative electrode, a material mixture slurry including the components of the material mixture and a dispersion medium may be used, as necessary. The negative electrode may also be formed by compression molding the material mixture; or by applying the material mixture slurry on a surface of a current collector, followed by drying, and then followed by rolling as necessary.

For a current collector used in the negative electrode, a current collector commonly used for electrochemical devices, e.g., a non-porous or porous conductive substrate, can be used. Examples of a metal material which forms the negative electrode current collector include stainless steel, nickel, copper, and a copper alloy.

Examples of the conductive agent include: carbon blacks such as acetylene black; conductive fibers such as carbon fibers; carbon fluorides; and graphites. The conductive agent may be in the form of either particles or fibers.

Examples of the binder include: fluorocarbon resins such as polyvinylidene fluoride; acrylic resins such as poly(methyl acrylate) and ethylene-methyl methacrylate copolymer; and rubber materials such as styrene-butadiene rubbers, acrylic rubbers, and modified products thereof.

Examples of the thickener include: cellulose derivatives such as carboxymethyl cellulose; and poly($C_{2-4}$alkylene) glycol such as polyethylene glycol.

Examples of the dispersion medium include the various solvents given for the non-aqueous solvent, preferred thereamong being an ether, e.g., THF, and N-methyl-2-pyrrolidone.

(Positive Electrode)

The positive electrode (first electrode) in the non-aqueous electrolyte battery (primary or secondary battery) includes the following as a positive electrode active material: a metal compound (e.g., an oxide; a sulfide; a halide such as a fluoride and a chloride); a fluorinated graphite; sulfur; or the like. Examples of the metal compound include: oxides such as iron (III) oxide and vanadium (V) oxide ($V_2O_5$); sulfides such as iron sulfide ($FeS_2$) and molybdenum sulfide ($MoS_2$); and halides (e.g., fluorides) such as iron (III) fluoride.

When the non-aqueous electrolyte has lithium ion conductivity, lithium composite oxides commonly used in a lithium ion battery can be used as the positive electrode active material, examples thereof including a lithium cobalt oxide ($LiCoO_2$), a lithium nickel oxide ($LiNiO_2$), a lithium manganese oxide ($LiMn_2O_4$, $LiMnO_2$, $Li_2Mn_2O_3$) and lithium iron phosphate ($LiFePO_4$).

These positive electrode active materials may be used singly or in a combination of two or more.

During charge and discharge, an electrochemical reaction occurs between: the positive electrode active material; and carrier ions such as the alkaline earth metal ions and/or the alkaline metal ions included in the non-aqueous electrolyte. For example, when a metal compound such as iron (III) oxide, a metal sulfide, or a metal fluoride is used as the positive electrode active material, during discharge, the metal compound is converted to a metal, whereas the alkaline earth metal ions are converted to a compound. At that time, depending on the kind of the metal compound, the alkaline earth metal ions (e.g., $Mg^{2+}$) and/or the alkaline metal ions (e.g., $Li^+$) convert to an oxide (e.g., MgO, $Li_2O$), a sulfide (e.g., MgS, $Li_2S$), or a fluoride (e.g., $MgF_2$, LiF).

When vanadium (V) oxide is used as the positive electrode active material, in the layered crystal structure of the vanadium (V) oxide, carrier ions such as the alkaline earth metal ions and/or the alkaline metal ions are reversibly intercalated and deintercalated between layers. When the positive electrode active material is sulfur, an alkaline earth metal sulfide and/or an alkaline metal sulfide are produced during discharge, and sulfur is reproduced during charge. When the positive electrode active material is fluorinated graphite, carbon and a fluoride (e.g., an alkaline earth metal fluoride such as $MgF_2$; an alkaline metal fluoride such as LiF) are produced.

Since the non-aqueous electrolyte includes the chloride ions, it can be combined with a positive electrode which uses a metal chloride as an active material, as mentioned above. Examples of such a metal chloride include transition metal chlorides such as vanadium chloride, chromium chloride, manganese chloride, iron chloride, cobalt chloride, nickel chloride, silver chloride, and copper chloride. Preferred among these metal chlorides, is silver chloride. When silver chloride is used as the positive electrode active material, during discharge, chloride ions are released from the silver chloride, thereby producing a silver metal; and during charge, silver chloride is reproduced. The same kinds of charge and discharge reactions occur, also when other kinds of metal chlorides are used.

In terms of increasing reversibility of the electrochemical reactions, the size (e.g., particle size) of the positive electrode active material is preferably small, and further preferably nano-size.

For a positive electrode current collector, a non-porous or porous conductive substrate used in electrochemical devices can be used. Examples of a conductive material used for the current collector include: metal materials such as stainless steel, titanium, aluminum, an aluminum alloy, molybdenum, and tungsten; and conductive carbonaceous materials.

For the positive electrode (first electrode) in the hybrid capacitor, a positive electrode used in a hybrid capacitor such as a lithium ion capacitor, or that used in an electric double layer capacitor can be used. Such a positive electrode can be an electrode through which a non-Faradaic current can flow, such as an electrode capable of adsorbing anions or a polarized electrode capable of forming a double electric layer; or may be an electrode capable of intercalating and deintercalating anions.

Regarding the positive electrode in the hybrid capacitor, examples of the positive electrode active material therein include: carbonaceous materials such as activated carbon, carbon black, graphite, carbon nanotubes, and fullerenes; polyacene semiconductor (PAS); and conductive polymers (e.g., polypyrrole; polythiophene; and a conductive radical polymer which is a n-conjugated polymer with free radicals (i.e., =N—C).) introduced thereto). Among the conductive polymers, there are polymers capable of intercalating and deintercalating anions. These positive electrode active materials may be used singly or in a combination of two or more.

The positive electrode is preferably a polarized electrode, and preferably includes an activated carbon as the positive electrode active material. Examples of the activated carbon include: activated carbons derived from a natural plant such as a coconut husk; activated carbons derived from a synthetic resin such as a phenol resin; and activated carbons derived from a fossil fuel such as coke. The activated carbon may also be an ultrafine activated carbon powder obtained by activating carbon black. These activated carbons may be used singly, or in a combination of two or more.

In the hybrid capacitor, during charge, anions (e.g., the chloride ions; anions produced due to interaction between an alkaline metal salt and an alkaline earth metal salt) adsorbs on the surface of the positive electrode and are intercalated in the positive electrode active material. Moreover, cations (the alkaline earth metal ions and/or the alkaline metal ions) are reduced at the surface of the negative electrode. During discharge, anions are released from the positive electrode and cations are released from the negative electrode.

In the electrochemical device, e.g., a non-aqueous electrolyte battery and a hybrid capacitor, the positive electrode can be formed in the same manner as the negative electrode, by using the positive electrode active material. The positive electrode can include, for example: the positive electrode active material; and as option(s), a conductive agent, a binder, and/or a thickener. The positive electrode may be formed by compression molding a mixture of the components; or may be formed by attaching a material mixture including the components, to a surface of the positive electrode current collector. The material mixture can include a dispersion medium, as necessary. For these components, the same examples as those given for the negative electrode can be used.

(Separator)

The electrochemical device can further comprise a separator, as necessary. The separator is interposed between the first electrode and the second electrode; and has a function of providing electric insulation therebetween, while also maintaining ion conductivity therebetween. When the non-aqueous electrolyte is a semisolid mixture (e.g., in the form of a meringue), interposing such a semisolid non-aqueous electrolyte between the first and second electrodes enables obtaining both ion conductivity and insulating properties, even without using the separator. The separator is used, for example, when the non-aqueous electrolyte used is a liquid. However, the separator may still be used, even when the non-aqueous electrolyte used is semisolid.

Examples of the separator include known separators used for non-aqueous electrolyte batteries or capacitors, examples of such known separators including a porous film and a non-woven fabric. Examples of a material forming the separator include: polyolefin resins such as polyethylene and polypropylene; and cellulose.

(Others)

For the electrochemical device, the first and second electrodes can be wound, with the separator therebetween separating the two, thereby to form an electrode group. The electrode group is not limited to a wound body, and may be a stacked body or a zigzag-folded body. The shape of the electrode group may be, for example, cylindrical or flat, in accordance with the shape of the electrochemical device, the shape of a case for the electrochemical device, etc.

The electrochemical device can be produced by including the electrode group, together with the non-aqueous electrolyte, in the case. For production of the electrochemical device, common methods known in the fields of non-aqueous electrolyte battery production and capacitor production, can be employed.

(Negative Electrode for Electrochemical Device)

An embodiment (embodiment (g)) of the present invention includes a negative electrode that is obtained by immersing a negative electrode current collector into the non-aqueous electrolyte, given above among others, that includes the alkaline earth metal chloride and the alkaline metal chloride; and passing a cathodic current through the negative electrode current collector, thereby to form deposits including an alkaline earth metal and an alkaline metal on a surface of the negative electrode current collector. That is, this negative electrode comprises: a negative electrode current collector; and deposits of a negative electrode active material including an alkaline earth metal and an alkaline metal, the deposits being attached to a surface of the negative electrode current collector. The non-aqueous electrolyte of the embodiment (b) can be given as the non-aqueous electrolyte used for the deposition of the negative electrode active material.

For the negative electrode current collector, the same examples as those given above can be used. However, preferred is a negative electrode current collector made of iron, an iron alloy, or the like.

For the negative electrode active material formed on the negative electrode current collector surface, an alloy comprising the alkaline earth metal and the alkaline metal included in the non-aqueous electrolyte (e.g., magnesium-lithium alloy), can be given as an example.

The negative electrode active material comprising an alloy including the alkaline earth metal and the alkaline metal, such as a magnesium-lithium alloy, is deposited in the shape of cones, on the negative electrode current collector surface. Each of these cones is partially spiral-shaped, having curves in successive loops; and this causes the deposits to have the shape of a rose flower. Thus, the deposits have satisfactory electric contact with the current collector, and also have a large surface area. Thus, when the above negative electrode is used in an electrochemical device (e.g., non-aqueous secondary battery such as lithium secondary battery), a ratio of a quantity of electricity conveyed in oxidation relative to a quantity of electricity conveyed in reduction can be made larger, and a high dissolution efficiency is obtained.

A lithium secondary battery using the above negative electrode comprises: the above negative electrode; a positive electrode; a separator interposed therebetween; and a non-aqueous electrolyte having lithium ion conductivity. The non-aqueous electrolyte having lithium ion conductivity comprises: a non-aqueous solvent; and a lithium salt dissolved in the non-aqueous solvent. For the lithium salt, a known salt used in lithium secondary batteries can be used, examples thereof including: $LiPF_6$, $LiBF_4$, $LiClO_4$, $LiCF_3SO_3$, and $LiN(SO_2CF_3)_2$.

The positive electrode can be a known positive electrode used in lithium secondary batteries; or a positive electrode including the lithium composite oxide among the examples thereof given above, or the like, as a positive electrode active material. The separator can be the same as that given as an example above.

EXAMPLES

In the following, the present invention will be described in detail with reference to Examples and Comparative Examples. However, note that the present invention is not limited to these Examples.

Example 1

(1) Preparation of Solution Containing Mg Ions

Inside a glove compartment of an argon atmosphere, anhydrous magnesium chloride ($MgCl_2$, available from Sigma-Aldrich Corporation, in the form of beads, with an average particle size of about 1 mm) and THF (Kishida Chemical Co., Ltd.) were mixed, such that the amount of the $MgCl_2$ relative to 1 mol of the THF was 0.025 mol (Sample No. 1), 0.033 mol (Sample No. 2), 0.05 mol (Sample No. 3), or 0.1 mol (Sample No. 4). The mixture was such that the $MgCl_2$ particles were dispersed in the liquid phase of the THF. After the mixture was stirred for 24 hours at 60° C., the $MgCl_2$ particle surface was diminished and the liquid phase of the THF became clouded. Subsequently the mixture was stirred for 72 hours at room temperature.

The $MgCl_2$ particles were not observed in the obtained mixtures of Sample Nos. 1 to 3. Therefore, presumably, all of the added $MgCl_2$ particles had dissolved in these mixtures. Regarding Sample No. 3, all of the $MgCl_2$ particles had dissolved, but after the obtained solution was left for a while, transparent rectangular crystals appeared therein through precipitation. This makes evident that the solution of Sample No. 3, immediately after preparation, was in a supersaturated state.

Regarding Sample No. 4, an emulsive mixture was obtained. After the mixture was left for a while, the $MgCl_2$ particles changed their shape to flocculent spheres and settled as precipitates. As can be seen in Example 3 described later, these precipitates were presumably at a point where the THF particles had attached to the $MgCl_2$ particles, and the $MgCl_2$ particles had started to link to one another in a chain-like manner. This makes evident that, the liquid phase of the mixture of Sample No. 4 included $MgCl_2$ in a saturated state.

The mixtures of Sample Nos. 1 to 4 underwent filtration using a filter (pore size: 0.2 μm, made of polytetrafluoroethylene (PTFE)), to obtain transparent solutions, respectively.

(2) Evaluation of Oxidation-Reduction Reaction when Working Electrode Used is Made of Iron By the following procedures, cells were assembled using the solutions of Sample Nos. 2 and 4, respectively, prepared in (1) above; and then, CV measurements were performed thereon.

First, inside a glove compartment of an argon atmosphere, a working electrode, i.e., an iron wire (available from The Nilaco Corporation, diameter: 1 mm); and a reference electrode and a counter electrode, i.e., each a strand of magnesium ribbon (available from Kojundo Chemical Laboratory Co., Ltd., width: 3.2 mm), were arranged in a cell case. The solution of Sample No. 2 was filled in the cell case, thereby to assemble a cell. Another cell was assembled in the same manner as above, with the exception of using the solution of Sample No. 4, instead of Sample No. 2.

Figure 2:
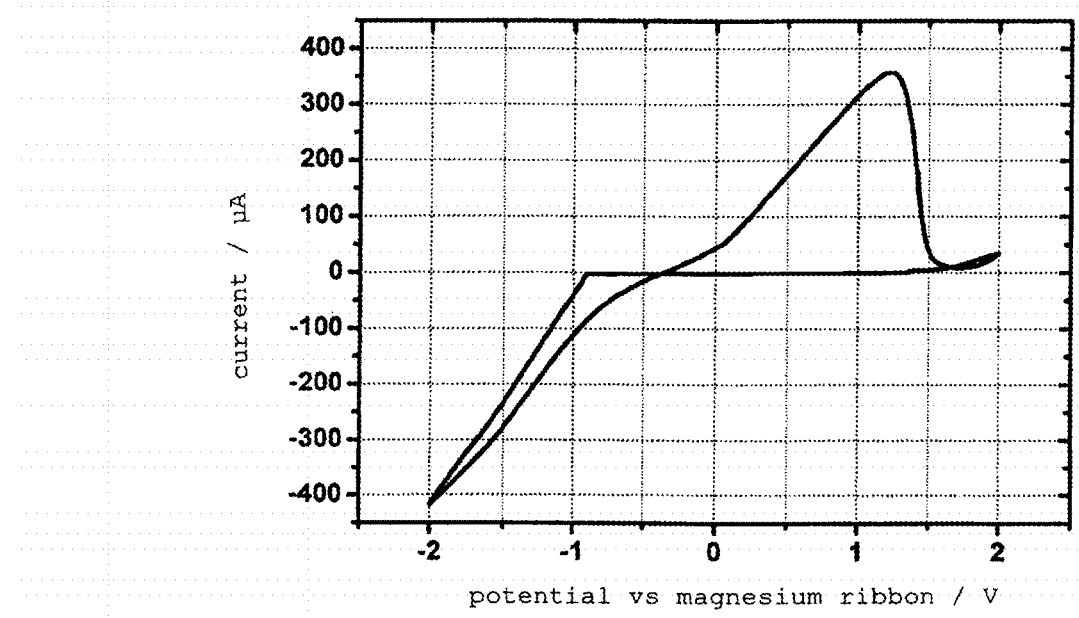

CV measurement was performed on the obtained cells. For the potential of the working electrode relative to the reference electrode, the scan range was −2.0 to 2.0 V and the scan rate was 1 mV/sec. FIG. 1 shows a cyclic voltammogram for when the solution of Sample No. 2 was used; and FIG. 2 shows a cyclic voltammogram for when the solution of Sample No. 4 was used. Each of FIGS. 1 and 2 is a diagram which plots the change in potential versus the change in current at the working electrode, when each of the solutions is used as a non-aqueous electrolyte. In each of the solutions of Sample Nos. 2 and 4, a current flowed in an amount indicative of deposition and dissolution of magnesium metal at the working electrode.

FIG. 3 shows an electron microscope image (magnification: 100 times) for observation of a tip end portion of the working electrode, when the solution of Sample No. 4 was used and the potential scan was stopped at the fourth scan in the cathode direction. As shown in FIG. 3, a large number of particles several μm in size were produced on the tip end portion of the working electrode made of iron. These particles were analyzed by methods such as energy dispersive X-ray spectroscopy and X-ray diffraction analysis, and were found to be particles of magnesium metal.

As above, elution and deposition of magnesium metal were observed in the cells which used the solutions in the Example. Therefore, evidently, when the electrode material used was possible of elution and deposition of magnesium metal, the solutions in the Example were able to be used as non-aqueous electrolytes and cause battery reactions.

(3) Evaluation of Oxidation-Reduction Reaction when Working Electrode Used is Made of Silver A cell was assembled in the same manner as (2) above, with the following exceptions: the solution of Sample No. 2 was used; the working electrode and the reference electrode were each a silver ribbon (available from The Nilaco Corporation); and the counter electrode was a magnesium ribbon.

CV measurement was performed on the obtained cell. For the potential of the working electrode relative to the reference electrode, the scan range was −1.0 to 0.5 V and the scan rate was 1 mV/sec. FIG. 4 shows a cyclic voltammogram for this CV measurement.

As shown in FIG. 4, an anodic current and a cathodic current were observed at the working electrode. Regarding FIG. 4, a ratio of a quantity of electricity conveyed in reduction relative to a quantity of electricity conveyed in oxidation was calculated, the ratio resulting in 0.9 or more. Moreover, a difference in potential between the working electrode and the counter electrode was also measured during the CV measurement, the difference resulting in 1.8 V at zero current. Furthermore, a potential scan in the anode direction caused the working electrode to change its color to reddish purple. This made evident that silver chloride was produced at the working electrode. Therefore, the cathodic current corresponded to a reaction of chloride ions being released from the silver chloride.

From the above, it was evident that the obtained cell was usable as a non-aqueous electrolyte secondary battery with a high energy density.

Comparative Example 1

A solution was prepared in the same manner as Sample No. 2 in Example 1, with the following exception: the mixture of the $MgCl_2$ and the THF was stirred for 96 hours at 60° C., and then the resultant underwent filtration using a filter. However, in the mixture prior to filtration, most of the $MgCl_2$ particles that were added had not dissolved.

CV measurement was performed by using the obtained solution (Sample No. 5) in the same manner as Example 1. However, there was no current flowing to the extent of enabling detection of deposition and dissolution of magnesium metal at the working electrode.

Comparative Example 2

Inside a glove compartment of an argon atmosphere, magnesium bis(trifluoromethanesulfonyl)imide $(Mg(N(SO_2CF_3)_2)_2)$ (available from Kishida Chemical Co., Ltd., hereafter referred to as $Mg(TFSI)_2$) and THF (available from Kishida Chemical Co., Ltd.) were mixed, such that the amount of the $Mg(TFSI)_2$ relative to 1 mol of the THF was 0.033 mol. The mixture of the $Mg(TFSI)_2$ and the THF was stirred at 60° C. As a result, the $Mg(TFSI)_2$ dissolved completely, and the mixture turned into a transparently clear solution. However, when the solution was cooled to room temperature, crystals of the $Mg(TFSI)_2$ precipitated, even by the slightest impact. That is, the obtained solution was a supersaturated solution, at room temperature. Thus, the precipitates were separated from the solution by using a filter same as that used in Example 1, thereby to obtain a saturated solution (Sample No. 6).

Figure 5:
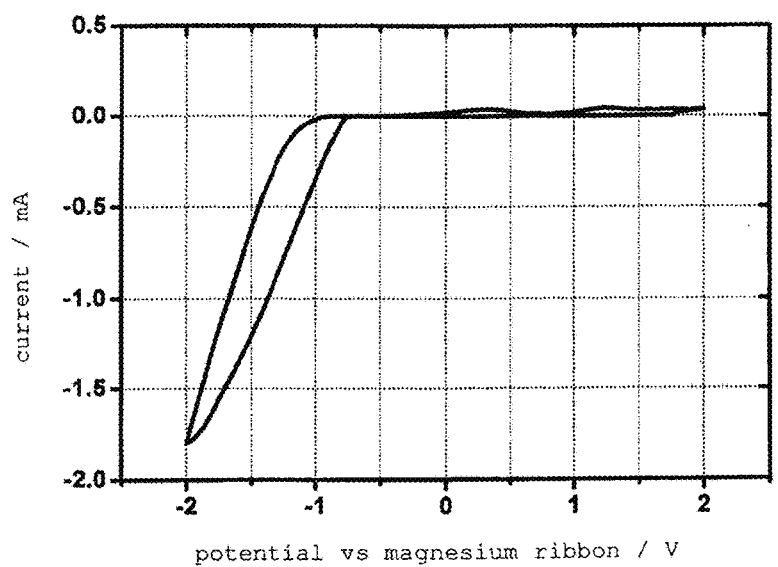

CV measurement was performed in the same manner as in (2) of Example 1, with the exception of using the solution of Sample No. 6. FIG. 5 shows a cyclic voltammogram for this CV measurement. As shown in FIG. 5, in the solution of Sample No. 6, a cathodic current indicative of deposition of magnesium metal flowed, but an anodic current indicative of dissolution of magnesium metal was extremely small. When the working electrode was observed after the potential scan was completed, magnesium metal was deposited thereon, even visible to the eye, and was in the form of dendrites. From the fact that the magnesium metal deposited in the solution of Sample No. 2 of the Example was granular, it is presumed that the magnesium metal deposited in the solution of Sample No. 6, being in the form of dendrites, caused decrease in the anodic current indicative of dissolution of the magnesium metal. When the cell was observed after scanning the potential eight times, a large number of crystals of the $Mg(TFSI)_2$ were present, as precipitates, in the solution.

Example 2

(1) Preparation of Solution Containing Mg Ions

Inside a glove compartment of an argon atmosphere, the following were mixed: a non-aqueous solvent, i.e., PC (available from Kishida Chemical Co., Ltd.); and lithium chloride (LiCl) (available from Sigma-Aldrich Corporation) and anhydrous magnesium chloride ($MgCl_2$) (available from Sigma Aldrich Corporation, average particle size: about 1 mm). They were mixed such that their respective proportions, in mols, relative to 1 mol of the PC, were as the values in Table 1. The mixture was stirred at 60° C. for 24 hours, and then cooled to room temperature. The state of the mixture after cooling is indicated in Table 1.

TABLE 1

| Sample No. | Non-aqueous solvent (mol) | $MgCl_2$ (mol) | LiCl (mol) | State of mixture after cooled to room temperature |
|---|---|---|---|---|
| 7 | PC (1) | 0.010 | 0.020 | LiCl particles did not dissolve, and thus remained |
| 8 | PC (1) | 0.020 | 0.020 | Single-phase solution |
| 9 | PC (1) | 0.033 | 0.033 | Single-phase solution |
| 10 | PC (1) | 0.050 | 0.050 | LiCl particles did not dissolve, and thus remained |
| 11 | PC (1) | 0.050 | 0.025 | Single-phase supersaturated solution |
| 12 | PC (1) | 0 | 0.033 | LiCl particles did not dissolve, and thus remained |
| 13 | PC (1) | 0.033 | 0 | Precipitation of crystals occurred |
| 14 | THF (1) | 0.020 | 0.020 | Single-phase solution |
| 15 | THF (1) | 0.020 | 0.040 | Single-phase solution |
| 16 | THF (1) | 0.020 | 0.010 | Single-phase solution |

Regarding Sample No. 13, a solution with $MgCl_2$ completely dissolved therein was obtained at 60° C.; however, crystals thereof precipitated, when the solution was cooled to room temperature. In contrast, regarding Sample Nos. 7 to 11 which included LiCl in addition to $MgCl_2$, there were times when the LiCl did not dissolve and thus remained; however, the $MgCl_2$ dissolved, and even when the mixture was cooled to room temperature, precipitation of crystals thereof was not observed. From these results, it is evident that the presence of both $MgCl_2$ and LiCl caused increase in the solubility of $MgCl_2$ in the non-aqueous solvent. Also, regarding Sample Nos. 14 to 16, each of which used THF as the non-aqueous solvent, a single-phase solution was obtained as with the cases where PC was used.

Regarding Sample No. 12 which included LiCl but not MgCl$_2$, even when the solution was stirred at 60° C., the LiCl did not dissolve and thus remained therein. In contrast, when a certain amount of MgCl$_2$ was included in addition to LiCl, both the MgCl$_2$ and the LiCl dissolved at 60° C.; and even when the solution was cooled to room temperature, it remained a single-phase solution (Sample Nos. 8, 9, and 11). In the case where the amount of MgCl$_2$ relative to LiCl was too small, or where the amount of LiCl relative to the non-aqueous solvent was too large, even when the solution was stirred at 60° C., the LiCl particles did not dissolve and thus remained (Sample Nos. 7 and 10). From these results, it is evident that the presence of both MgCl$_2$ and LiCl caused increase in the solubility of LiCl in the non-aqueous solvent.

(2) Evaluation of Magnesium Ion Conductivity

Figure 6:
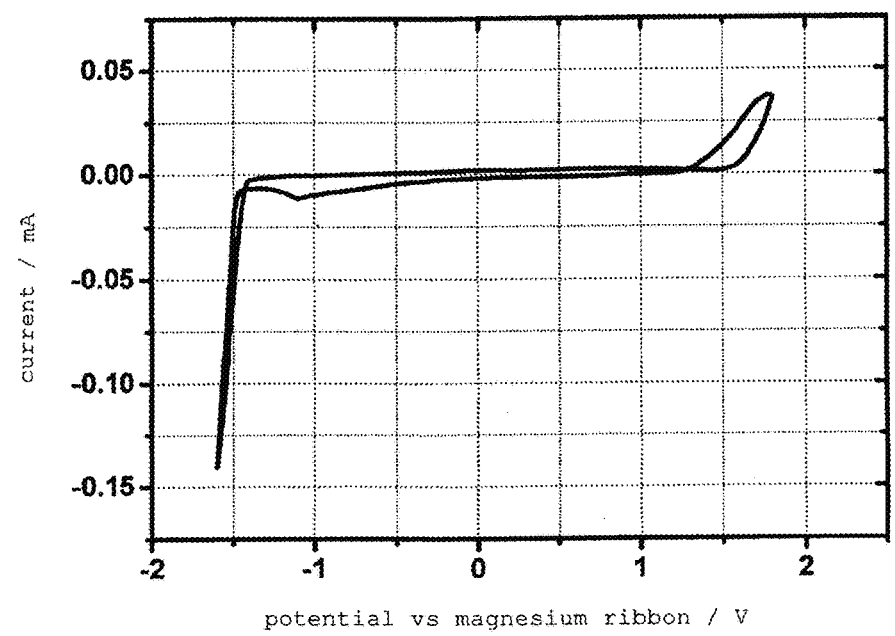
FIG. 6 A cyclic voltammogram for a solution of Sample No. 14 in Example 2
Figure 7:
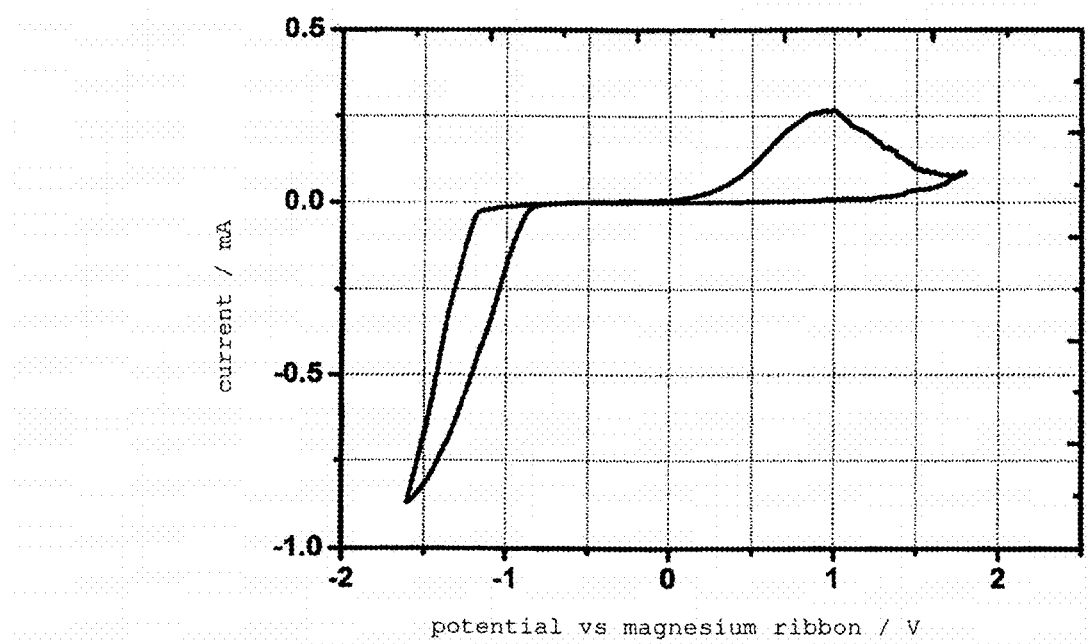
FIG. 7 A cyclic voltammogram for a solution of Sample No. 15 in Example 2

Cells were assembled in the same manner as in (2) of Example 1, with the exception of using the solution of Sample No. 14 and the solution of Sample No. 15, respectively. CV measurement was performed on the obtained cells. For the potential of the working electrode relative to the reference electrode, the scan range was −1.6 to 1.8 V and the scan rate was 1 mV/sec. FIG. 6 shows a cyclic voltammogram for when the solution of Sample No. 14 was used; and FIG. 7 shows a cyclic voltammogram for when the solution of Sample No. 15 was used. Each of FIGS. 6 and 7 is a diagram which plots the change in potential versus the change in current of the working electrode, when each of the solutions is used as the non-aqueous electrolyte.

As shown in FIG. 6, in the solution of Sample No. 14, a cathodic current flowed from when the potential was near −1.4 V during a scan in the cathode direction. At that time, black granules were deposited on the working electrode. By energy dispersive X-ray spectroscopy, these black granules were observed as including Mg. During a subsequent scan in the anode direction, an anodic current started to flow from when the potential was near −0.6 V, but it was a small current. Note that in FIG. 6, the anodic current starting from around 1.4 V corresponds to the current at which an iron wire dissolves.

As shown in FIG. 7, in the solution of Sample No. 15, a cathodic current flowed from when the potential was near −1.2 V during a scan in the cathode direction. At that time, black granules including Mg were deposited on the working electrode in larger amounts than in the case of the solution of Sample No. 14. During a subsequent scan in the anode direction, a large anodic current started to flow from when the potential was approximately 0 V. Evidently, in the solution of Sample No. 15, there were precipitation and dissolution of magnesium metal or a lithium alloy mainly composed of magnesium.

As such, the non-aqueous electrolyte including MgCl$_2$ and LiCl exhibited magnesium ion conductivity.

(3) Evaluation of Lithium Ion Conductivity

Figure 8:
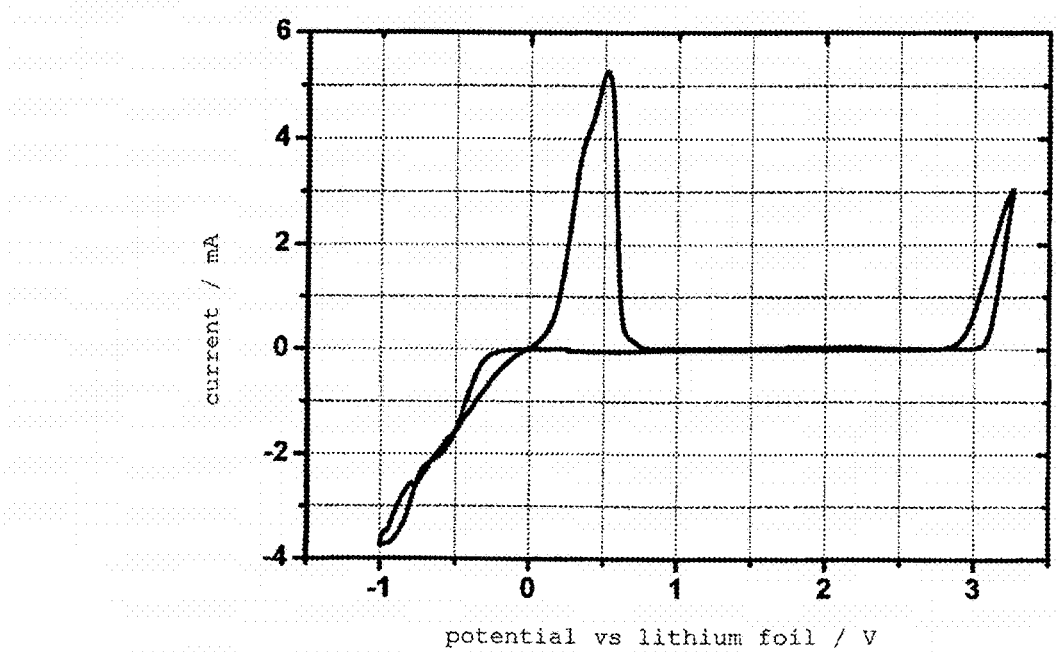
FIG. 8 A cyclic voltammogram for a solution of Sample No. 9 in Example 2

A cell was assembled in the same manner as in (2) of Example 1, with the exception of using the solution of Sample No. 9 and using a lithium foil as the reference electrode. CV measurement was performed on the obtained cell. For the potential of the working electrode relative to the reference electrode, the scan range was −1 to 3 V and the scan rate was 1 mV/sec. A cyclic voltammogram for this CV measurement is shown in FIG. 8. FIG. 8 is a diagram which plots the change in potential versus the change in current of the working electrode, when the solution of Sample No. 9 was used as the non-aqueous electrolyte.

As shown in FIG. 8, a cathodic current flowed at areas where the potential was lower than 0, and an anodic current flowed at areas where the potential was higher than 0. From the above, it is evident that a magnesium alloy mainly composed of lithium metal was deposited on the working electrode. Note that in FIG. 8, the anodic current starting from around 3 V corresponds to the current at which an iron wire dissolves. As such, lithium ion conductivity was obtained in the non-aqueous electrolyte including LiCl in addition to MgCl$_2$.

(4) Evaluation of Lithium-Magnesium Alloy Formation by Using Lithium Electrode

By the following procedure, an observation was made for formation of a lithium-magnesium alloy on the working electrode, when the solution of Sample No. 16 was used and lithium metal was used as the counter electrode.

First, inside a glove compartment of an argon atmosphere, a working electrode, i.e., an iron wire (available from The Nilaco Corporation, diameter: 1 mm), and a counter electrode, i.e., a lithium foil (available from Honjo Metal Co., Ltd.), were immersed in the solution of Sample No. 16. Under such conditions, a cathodic current with a current density of about 0.5 mA/cm$^2$ was applied to the working electrode for 30 minutes. This caused formation of deposits on a surface of the working electrode. FIG. 9 shows an electron microscope image (magnification: 5000 times) of the deposits. The deposits were analyzed by energy dispersive X-ray spectroscopy, and were observed to be an alloy including magnesium and lithium.

(5) Evaluation of Negative Electrode for Non-Aqueous Electrolyte Secondary Battery Inside a glove compartment of an argon atmosphere, a test electrode, i.e., the iron electrode with the deposits formed thereon obtained in (4) above, and a counter electrode and a reference electrode, i.e., each a lithium foil, were all arranged in a cell case. A non-aqueous electrolyte including LiPF$_6$ was filled in the cell case, thereby to assemble a cell. At that time, the non-aqueous electrolyte used was a solution comprising: a mixed solvent including EC and DMC at an EC/DMC molar ratio of 1/1; and LiPF$_6$ dissolved therein at a concentration of 1 mol/L.

CV measurement was performed on the obtained cell. For the potential of the test electrode relative to the reference electrode, the scan range was −0.4 to 2.0 V and the scan rate was 1 mV/sec. Measurements were also made to obtain a quantity of electricity conveyed in reduction per oxidation-reduction cycle, and a quantity of electricity conveyed in oxidation per oxidation-reduction cycle.

FIG. 10 is a diagram which plots each of the quantity of electricity conveyed in reduction (Qcathodic) and the quantity of electricity conveyed in oxidation (Qanodic), per oxidation-reduction cycle. As shown in FIG. 10, a ratio of the quantity of electricity conveyed in oxidation relative to that conveyed in reduction exceeds 0.98. From the above, it is evident that the above test electrode was usable as a negative electrode material with excellent dissolution efficiency, in a non-aqueous electrolyte secondary battery. Presumably, this result is related to the features of the deposits including magnesium that were formed on the test electrode surface, i.e., the deposits having a spiral cone shape as shown in FIG. 9 and thus being able to have satisfactory electric contact with an iron wire as a substrate and to also have a large surface area.

Example 3

(1) Preparation of Semi-Solid Non-Aqueous Electrolyte

Inside a glove compartment of an argon atmosphere, anhydrous magnesium chloride ($MgCl_2$, available from Sigma-Aldrich Corporation, in the form of beads, with an average particle size of about 1 mm) and THF (Kishida Chemical Co., Ltd.) were put into a reaction vessel with a rotator (stir bar) therein, such that the amount of the $MgCl_2$ relative to 1 mol of the THF was 0.1 mol. The reaction vessel was set on a magnetic stirrer. Then, the magnetic stirrer was set to a stirring rate of the lowest value possible for the rotator to conduct stirring; and the contents in the reaction vessel was slowly stirred, thereby to mix the contents. The temperature of the mixture at that time was 30° C.

As the mixture got stirred, the magnesium chloride particles in the form of beads dispersed in the liquid phase, thus gradually causing the particle surface to diminish. Further stirring caused the mixture to become emulsive overall, and flocculent products were produced in the mixture. Still further stirring caused the mixture to become meringue-like. The obtained meringue-like mixture (Sample No. 17) was semisolid; and was freely deformable, while also being able to maintain a predetermined form.

A meringue-like mixture (Sample No. 18) was obtained in the same manner as above, with the exception of changing the amount of the $MgCl_2$ relative to 1 mol of the THF, to 0.5 mol. The mixture of Sample No. 18 was also semisolid; and was freely deformable, while also being able to maintain a predetermined form. Note that the mixture of Sample No. 17 was moister compared to the mixture of Sample No. 18.

Figure 11:
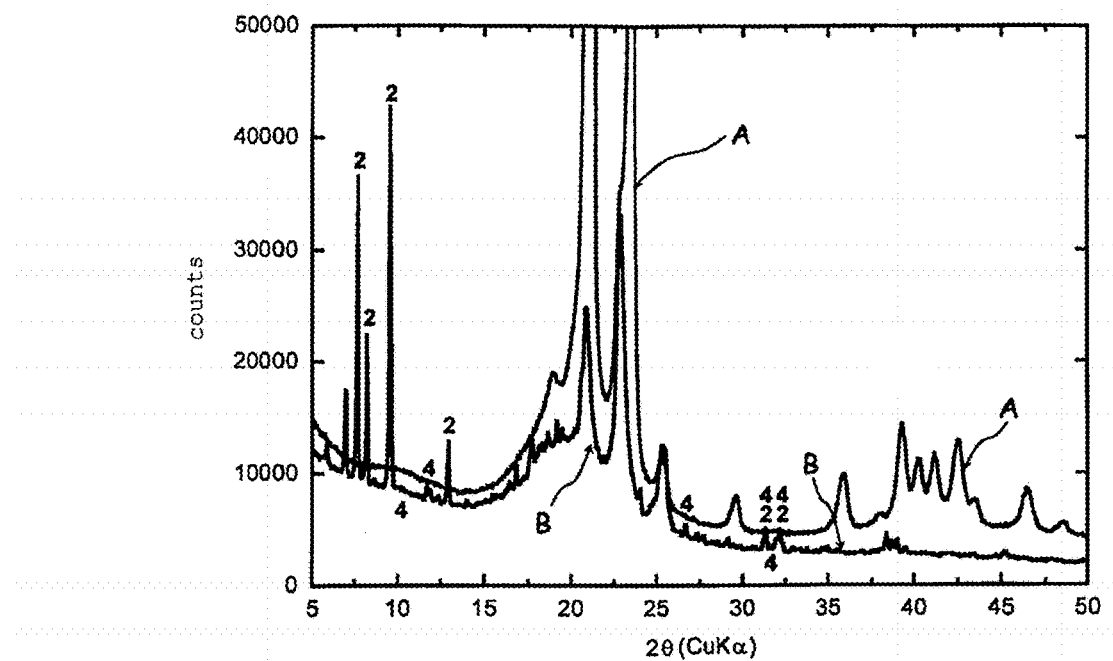
FIG. 11 An X-ray diffraction spectrum which results from a θ-2θ measurement using a CuKα ray, for a mixture of Sample No. 17 in Example 3
Figure 12:
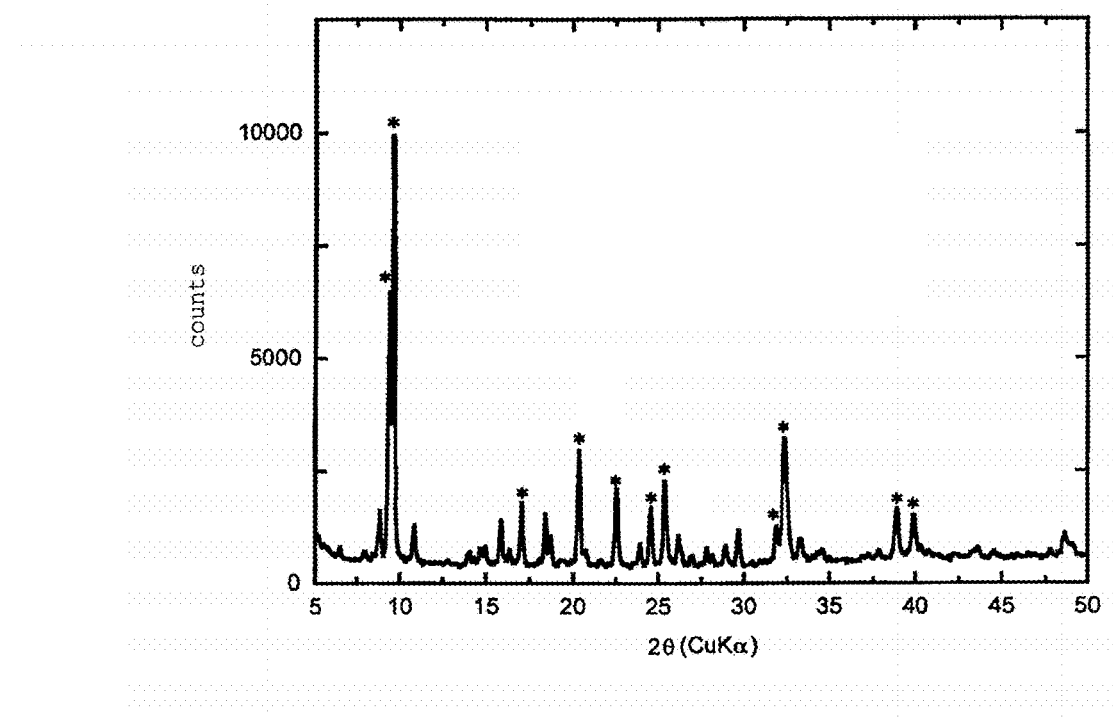
FIG. 12 An X-ray diffraction spectrum which results from a θ-2θ measurement using a CuKα ray, for a mixture of Sample No. 18 in Example 3

FIGS. 11 and 12 are both X-ray diffraction spectra which result from a θ-2θ measurement using a CuKα ray, FIG. 11 for the mixture of Sample No. 17 and FIG. 12 for the mixture of Sample No. 18. In FIG. 11, a solid line B in black indicates a diffraction pattern for the meringue-like mixture and the measuring jig; and a solid line A indicates a diffraction pattern for only the measuring jig.

In the diffraction pattern in FIG. 11, peaks caused by an adduct $MgCl_2.2THF$ were observed when 2θ was approximately 7.5 to 10°, 13°, and 31 to 32°; and peaks caused by an adduct $MgCl_2.4THF$ were observed when 2θ was approximately 10 to 12°, 22°, and 31 to 32°. In FIG. 11, the peaks caused by the adduct $MgCl_2.2THF$ are indicated with "2"; and the peaks caused by the adduct $MgCl_2.4THF$ are indicated with "4".

In the diffraction pattern in FIG. 12, peaks caused by an adduct $MgCl_2.1.5THF$ were observed when 2θ was approximately 17°, 21 to 26°, 32 to 33°, and 38 to 40°. In FIG. 12, the peaks caused by the adduct $MgCl_2.1.5THF$ are indicated with "*".

It is not clear what caused the above semisolid mixtures to be obtained. However, the X-ray diffraction patterns show peaks that are unidentifiable with known compounds; and therefore, assumedly, there were magnesium ions with chloride ions or tetrahydrofuran coordinated thereto, that formed a polynuclear complex and were thus linked to one another in a chain-like manner. Also, presumably, there was a polymer coordinated to magnesium ions, the polymer having been produced by ring-opening polymerization of tetrahydrofuran.

(2) Evaluation of Oxidation-Reduction Reaction

By the following procedures, a cell was assembled using the meringue-like non-aqueous electrolyte of Sample No. 17 prepared in (1) above; and then, CV measurement was performed thereon.

First, inside a glove compartment of an argon atmosphere, the non-aqueous electrolyte of Sample No. 17 was filled in a cell case. Then, 2 strands of magnesium ribbons (available from Kojundo Chemical Laboratory Co., Ltd), each connected to a nickel lead via indium, were prepared as counter and reference electrodes made of magnesium metal. Then, the counter and reference electrode, and a working electrode, i.e., an iron wire (available from The Nilaco Corporation, diameter: 1 mm), were arranged in the cell case, such that they were immersed in the non-aqueous electrolyte, thereby to assemble a cell.

Figure 13:
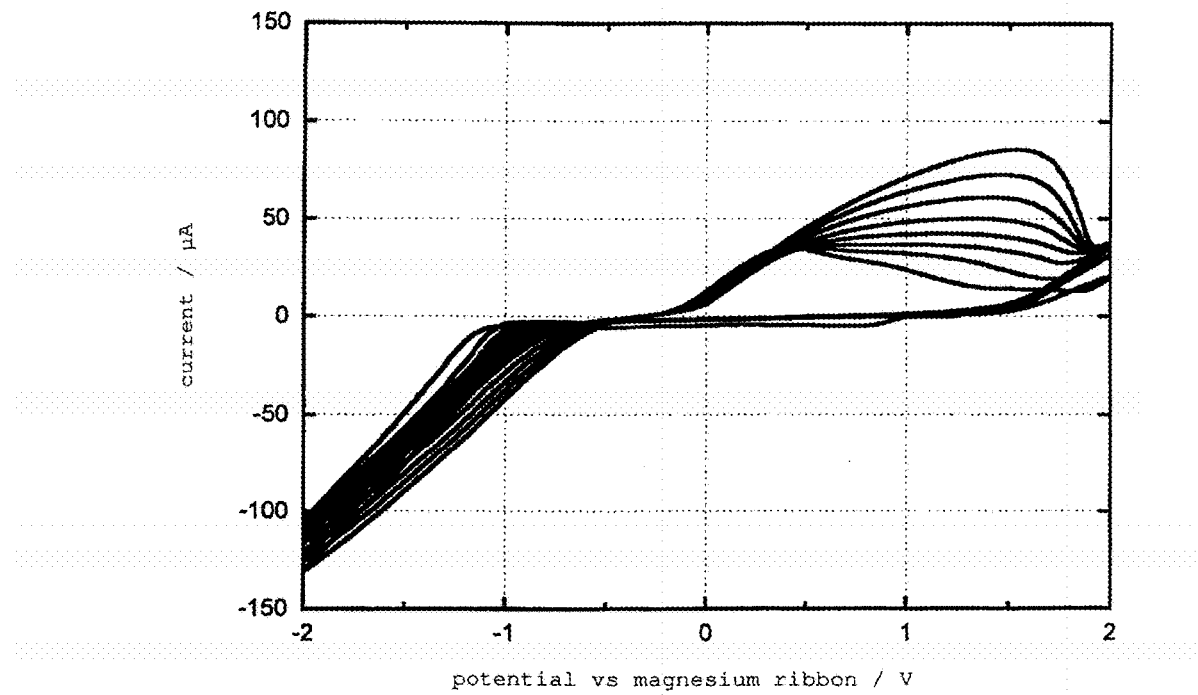
FIG. 13 A cyclic voltammogram for the mixture of Sample No. 17 in Example 3

CV measurement was performed on the obtained cell. For the potential of the working electrode relative to the reference electrode, the scan range was −2.0 to 2.0 V and the scan rate was 1 mV/sec. A cyclic voltammogram for this CV measurement is shown in FIG. 13. FIG. 13 is a diagram which plots the change in potential versus the change in current at the working electrode, when the non-aqueous electrolyte of Sample No. 17 is used.

As shown in FIG. 13, a current indicative of deposition and dissolution of magnesium metal flowed at the working electrode made of iron. This makes evident that the mixture of Sample No. 17 functions as a non-aqueous electrolyte. From the fact that internal short circuits did not occur between the working and counter electrodes even with repeated oxidation-reduction cycles, evidently, there is suppression of formation of needle-shaped deposits on the working electrode surface.

The reason why deposition and dissolution of magnesium metal occur satisfactorily in the non-aqueous electrolyte of Sample No. 17, despite its being semisolid, is presumably due, not only to the conduction of magnesium ions in the THF remaining as a liquid; but also to the magnesium compound (adduct), having become a solid, contributing to the conduction of magnesium ions. The result of Sample No. 17 also suggests that an ion conduction mechanism differing from that in a polymer electrolyte produced by $MgCl_2$ dissolving uniformly, contributes to the above semisolid non-aqueous electrolyte.

Figure 14:
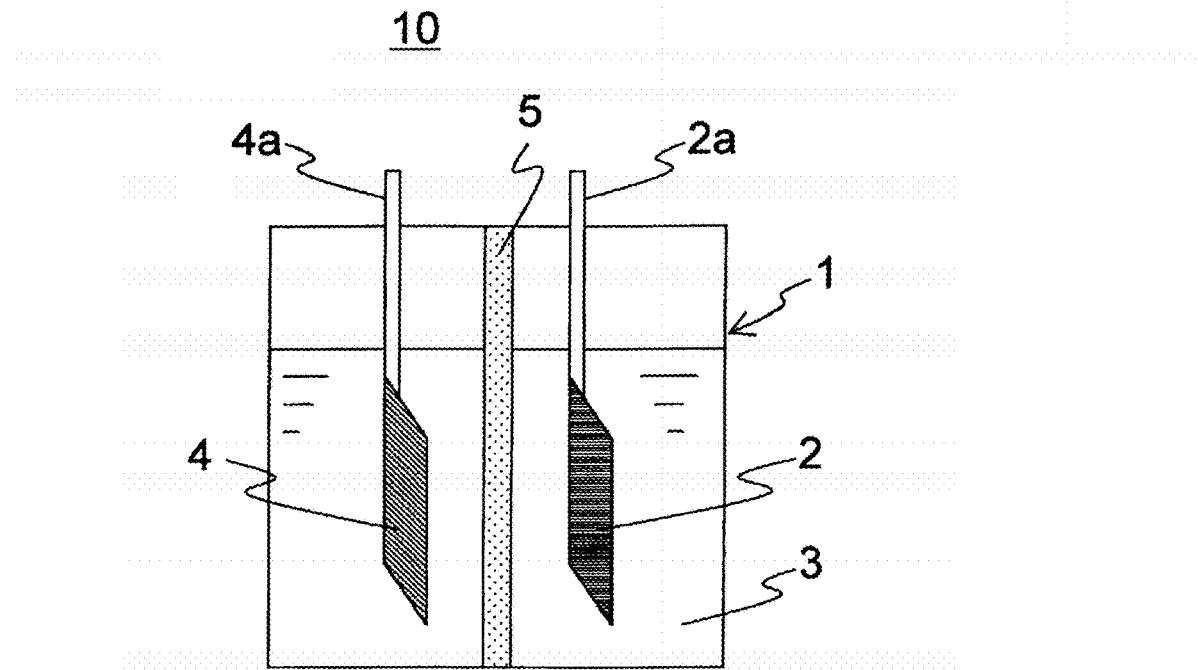
FIG. 14 An illustration of the structure of an electrochemical device in one example, to show the concept thereof.

FIG. 14 illustrates an example of the structure of an electrochemical device 10. The electrochemical device 10 comprises: a case 1; a non-aqueous electrolyte 3 contained in the case 1; a positive electrode 2; and a negative electrode 4, the positive and negative electrodes being immersed in the non-aqueous electrolyte 3. As illustrated in FIG. 14, the positive electrode 2 and the negative electrode 4 can be made to face each other, with a separator 5 interposed therebetween. A positive electrode lead 2a made of metal can be connected to the positive electrode 2 and extended out from the case 1, thereby to form an external terminal for the positive electrode. Moreover, a negative electrode lead 4a made of metal can be connected to the negative electrode 4 and extended out from the case 1, thereby to form an external terminal for the negative electrode. The structure of the electrochemical device 10 is not limited to the structure described above, which is merely one example.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The non-aqueous electrolyte according to the embodiment of the present invention has high ion conductivity, despite the electrolyte including a large amount of the non-aqueous solvent and the alkaline earth metal chloride, in total. This is because the alkaline earth metal chloride is dissolved at high concentrations. Moreover, since the alkaline earth metal chloride having a small formula weight can be used as a supporting salt in the non-aqueous electrolyte, the amount of the non-aqueous electrolyte used can be reduced, thereby enabling improvement in the energy density in electrochemical devices.

Thus, the above non-aqueous electrolyte can be applied in various electrochemical devices such as batteries (primary batteries, secondary batteries) and capacitors (e.g., hybrid capacitors). Moreover, an electrochemical device which uses the above non-aqueous electrolyte is useful as the power source for devices such as cellular phones, personal digital assistants, personal computers, video cameras, and portable game consoles. Still moreover, such an electrochemical device can be utilized as the power source for driving or supporting driving of electric motors in vehicles such as hybrid electric vehicles, plug-in hybrid electric vehicles, and fuel cell vehicles; and also, as the power source for driving of electric tools, vacuum cleaners, robots, etc.

The invention claimed is:

1. An electrochemical device comprising:
a first electrode;
a second electrode differing from the first electrode in polarity; and
a non-aqueous electrolyte, wherein:
the non-aqueous electrolyte comprises a non-aqueous solvent and an alkaline earth metal chloride
the non-aqueous electrolyte further comprises an alkali metal chloride dissolved in the non-aqueous solvent,
a total content of the non-aqueous solvent and the alkaline earth metal chloride is 90 mass % or more in the non-aqueous electrolyte,
the alkaline earth metal chloride is dissolved in an amount of 0.03 mol or more relative to 1 mol of the non-aqueous solvent,
an amount of the alkali metal chloride relative to 1 mol of the alkaline earth metal chloride is 0.4 to 2.5 mol, and
the non-aqueous electrolyte does not include an aluminum complex.

2. The electrochemical device in accordance with claim 1, wherein the alkaline earth metal chloride includes at least magnesium chloride.

3. The electrochemical device in accordance with claim 1, wherein the alkali metal chloride includes at least lithium chloride.

4. The electrochemical device in accordance with claim 1, wherein the non-aqueous solvent includes at least tetrahydrofuran, and the alkaline earth metal chloride is magnesium chloride.

5. The electrochemical device in accordance with claim 4, including: a solid adduct comprising the magnesium chloride, and the tetrahydrofuran added to the magnesium chloride; and a solution comprising the tetrahydrofuran, and the magnesium chloride dissolved in the tetrahydrofuran, the non-aqueous electrolyte being in the form of a meringue with air bubbles therein.

6. The electrochemical device in accordance with claim 5, wherein an amount of the magnesium chloride included in the non-aqueous electrolyte is 0.05 to 0.6 mol relative to 1 mol of the tetrahydrofuran.

7. The electrochemical device in accordance with claim 5, wherein the adduct is a compound in which 1.5 to 4 molecules of the tetrahydrofuran is added to 1 molecule of the magnesium chloride.

8. The electrochemical device in accordance with claim 1, wherein the non-aqueous solvent includes an ether in an amount exceeding 50 mol %.

9. A method for producing an electrochemical device comprising: a first electrode differing from the first electrode in polarity, and a non-aqueous electrolyte, the method comprising:
a step A of stirring, while heating at a temperature of 50° C. or higher, a mixture including a non-aqueous solvent and an alkaline earth metal chloride; and
a step B of cooling to a temperature of 35° C. or lower, the mixture obtained in the step A, followed by further stirring, thereby to produce the non-aqueous electrolyte, wherein:
the non-aqueous electrolyte further comprises the alkali metal chloride dissolved in the non-aqueous solvent,
a total content of the non-aqueous solvent and the alkaline earth metal chloride is 90 mass % or more in the non-aqueous electrolyte,
the alkaline earth metal chloride is dissolved in an amount of 0.03 mol or more relative to 1 mol of the non-aqueous solvent,
an amount of the alkali metal chloride relative to 1 mol of the alkaline earth metal chloride is 0.4 to 2.5 mol, and
the non-aqueous electrolyte does not include an aluminum complex.

10. A method of producing an electrochemical device comprising: a first electrode differing from the first electrode in polarity, and a non-aqueous electrolyte, the method comprising:
a step C of stirring, at a temperature of 35° C. or lower, a mixture including a non-aqueous solvent and magnesium chloride, the non-aqueous solvent including at least tetrahydrofuran, an amount of the magnesium chloride being 0.05 mol or more relative to 1 mol of the non-aqueous solvent, thereby to produce a non-aqueous electrolyte in the form of a meringue,
the non-aqueous electrolyte including: an adduct comprising the tetrahydrofuran, and the magnesium chloride added to the tetrahydrofuran; and a solution comprising the tetrahydrofuran, and the magnesium chloride dissolved at a saturation concentration in the tetrahydrofuran, wherein
a total content of the non-aqueous solvent and the alkaline earth metal chloride is 90 mass % or more in the non-aqueous electrolyte,
an amount of the alkali metal chloride relative to 1 mol of the alkaline earth metal chloride is 0.4 to 2.5 mol, and
the non-aqueous electrolyte does not include an aluminum complex.

* * * * *